V., J. & W. RAGONA.
PAPER BOX MAKING MACHINE.
APPLICATION FILED MAR. 16, 1911.

1,019,276.

Patented Mar. 5, 1912.
8 SHEETS—SHEET 1.

Witnesses:
Eugene Giammattes
Abraham Rosenblum

Inventors
William Ragona
Vincent Ragona
John Ragona

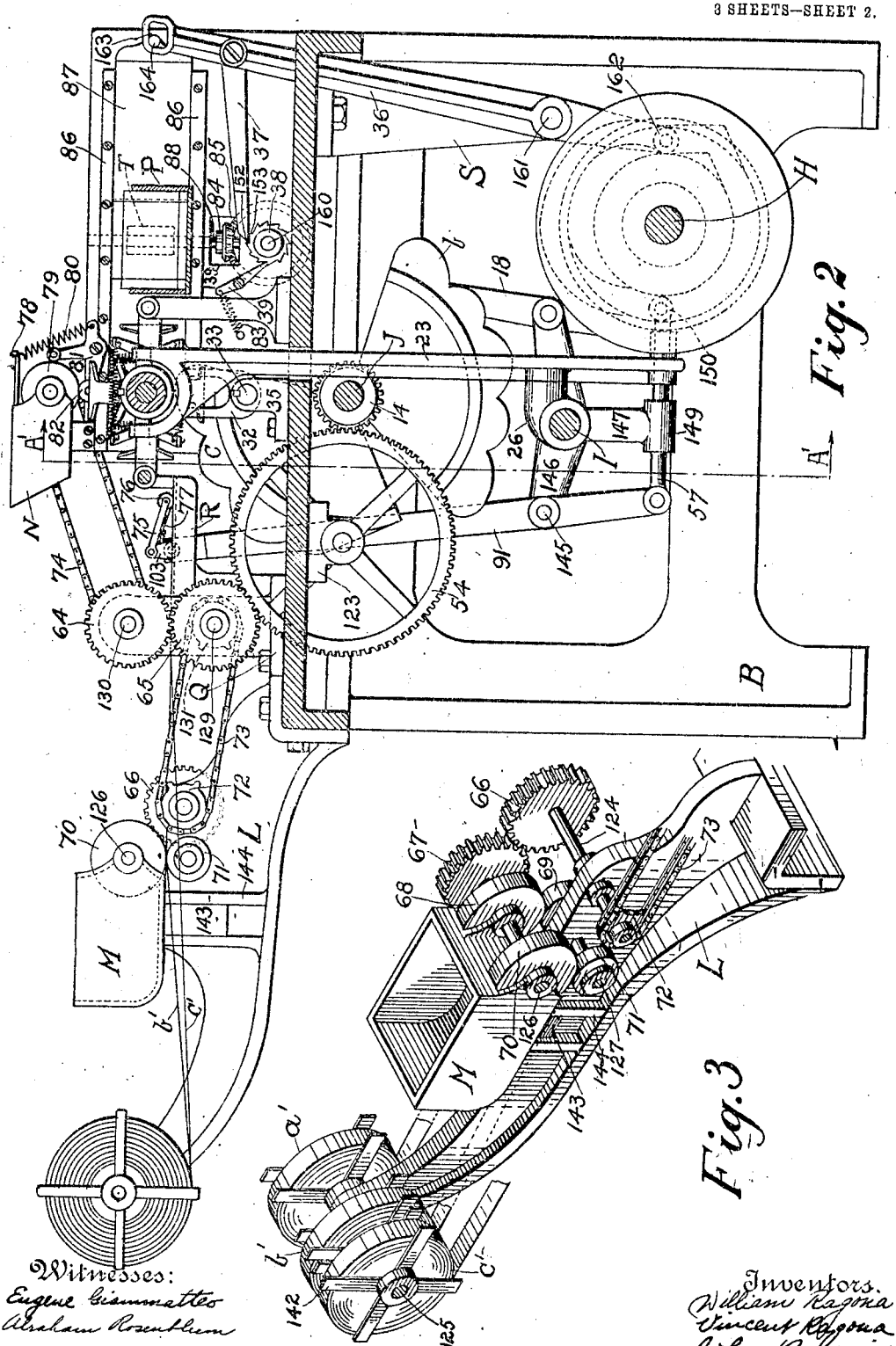

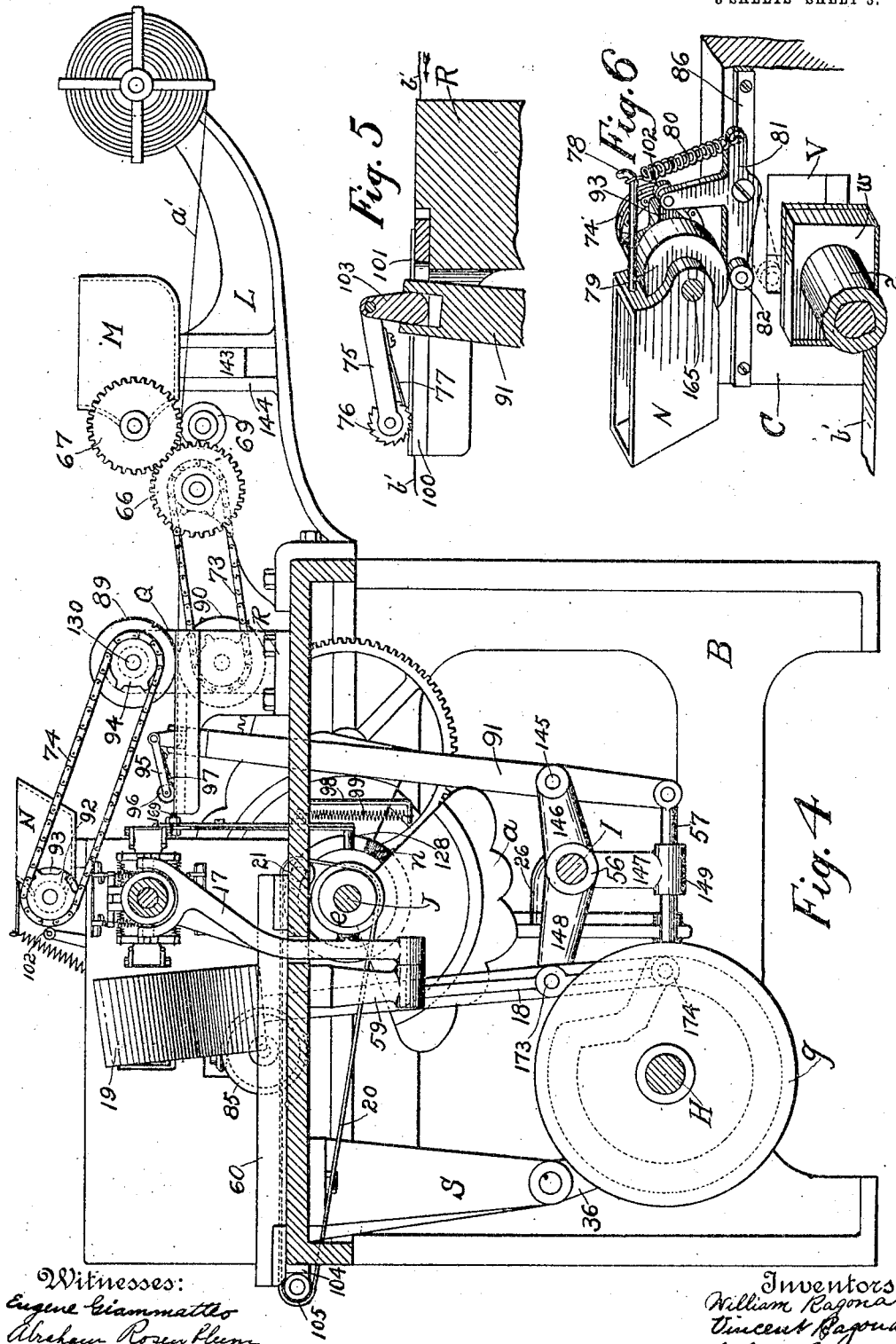

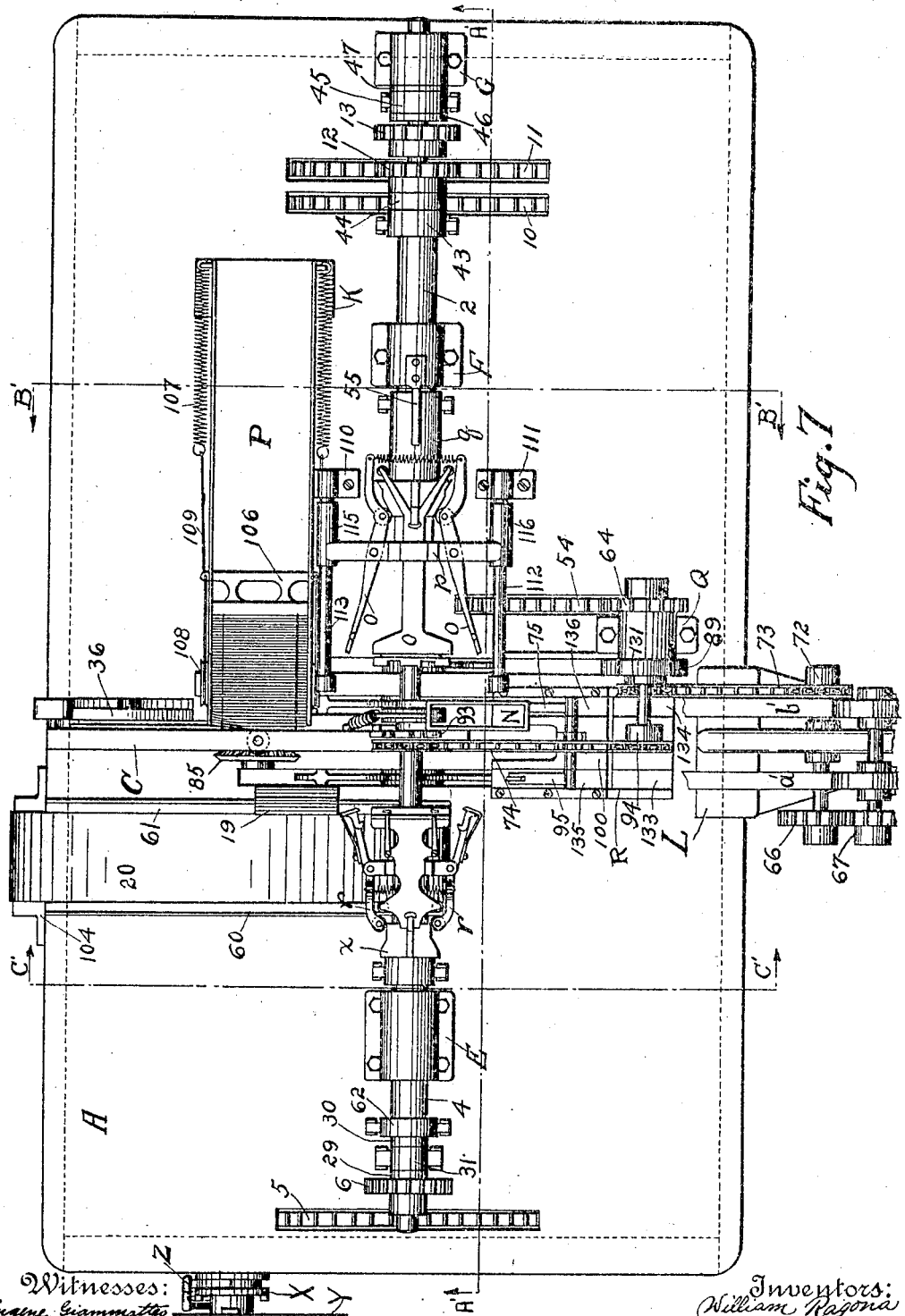

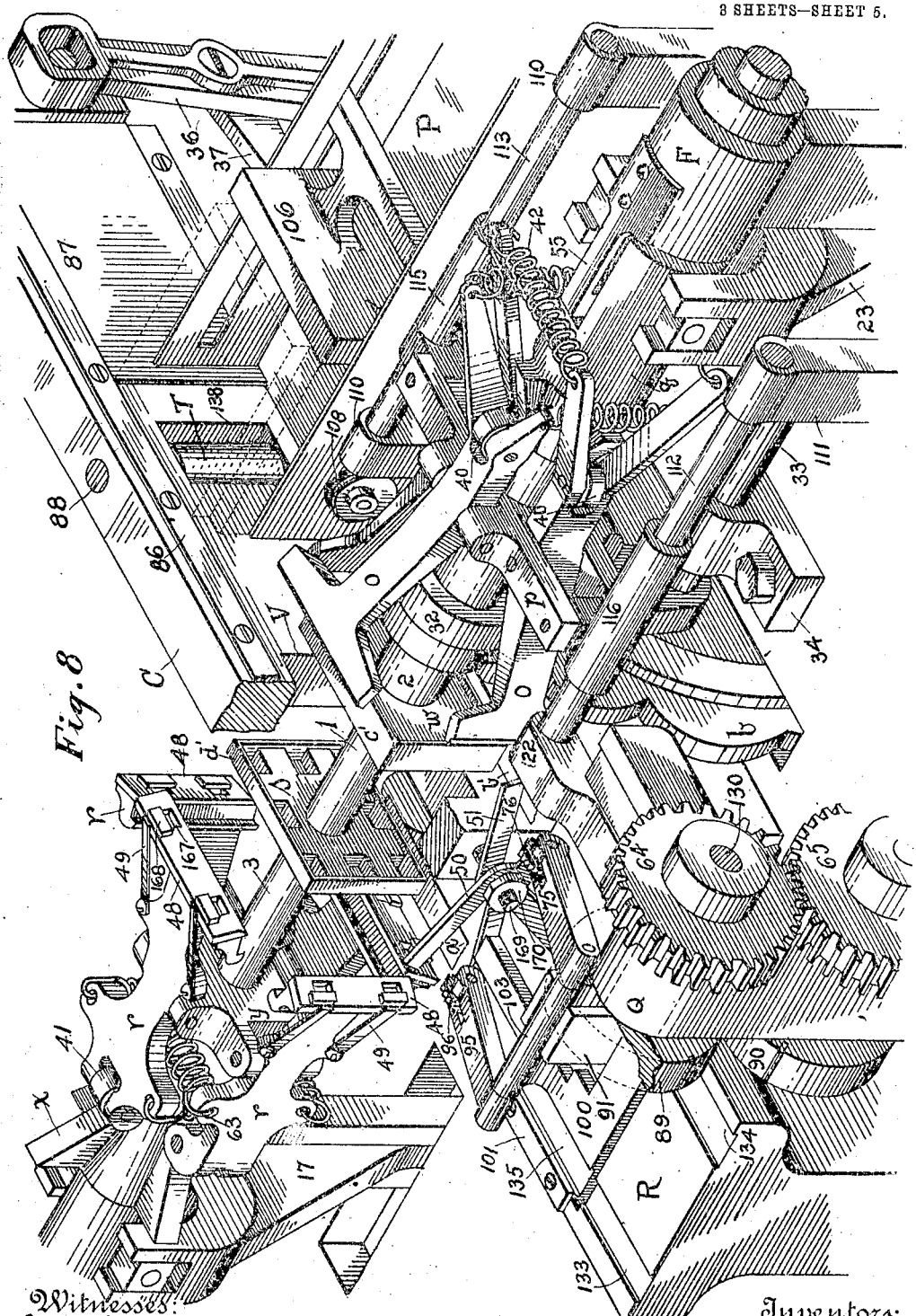

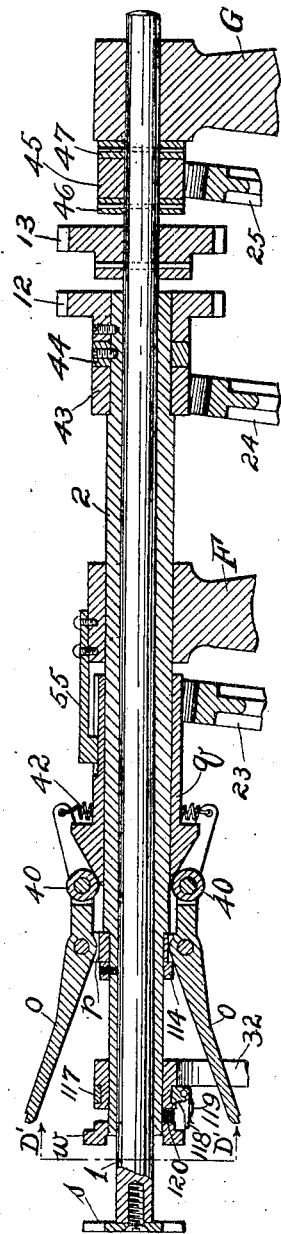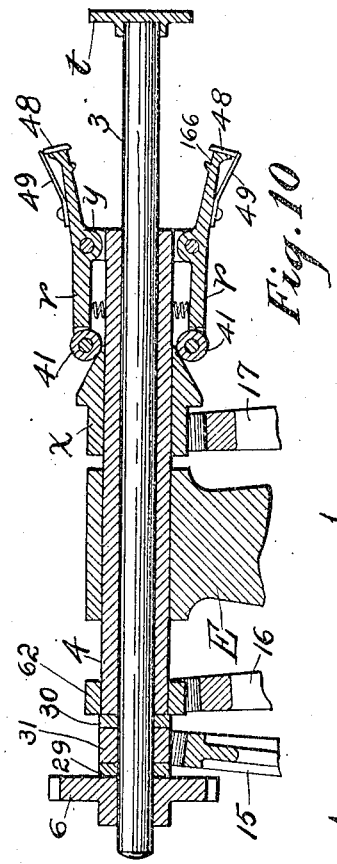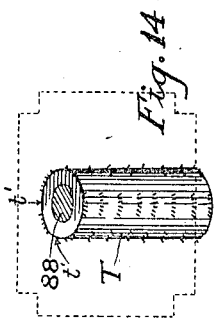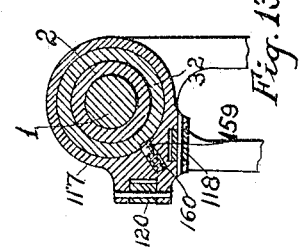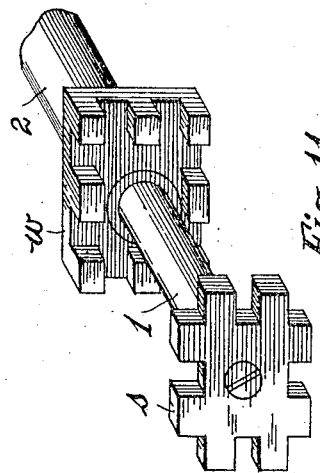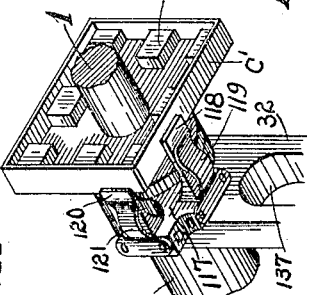

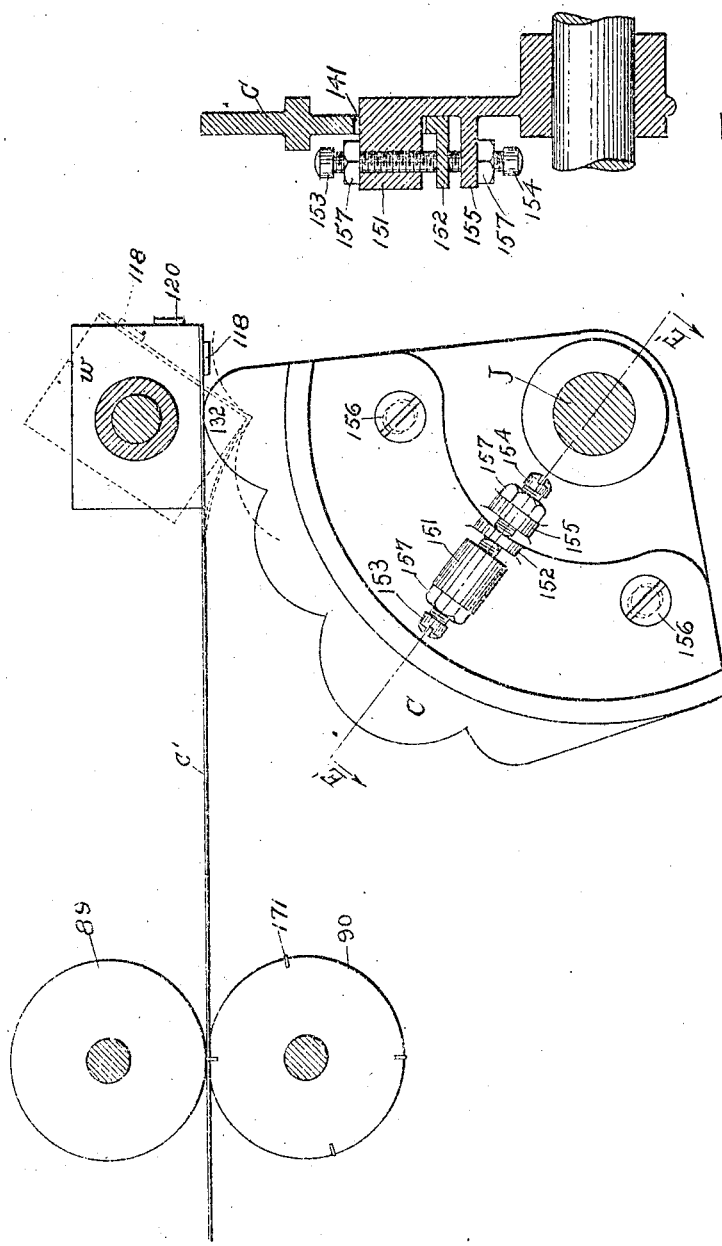

UNITED STATES PATENT OFFICE.

VINCENT RAGONA, JOHN RAGONA, AND WILLIAM RAGONA, OF NEW YORK, N. Y.

PAPER-BOX-MAKING MACHINE.

1,019,276.  Specification of Letters Patent.  Patented Mar. 5, 1912.

Application filed March 16, 1911  Serial No. 614,949.

*To all whom it may concern:*

Be it known that we, VINCENT RAGONA, a citizen of the United States, and JOHN RAGONA and WILLIAM RAGONA, subjects of the King of Italy, residing in the borough of Manhattan, in the city, county, and State of New York, have invented new and useful Improvements in Paper-Box-Making Machines, of which the following is a specification, reference being had therein to the accompanying drawings, which form a part thereof.

This invention relates to machinery for rapidly and automatically manufacturing paper boxes or their covers, and especially for those consisting of a body and "neck," (as it will hereinafter be termed) that is, a lining suitably placed around the inside of the body, against and protruding above the sides of the body, so that when a cover of the same dimensions of the body is fitted over the protruding portion of the said lining, the sides of both body and cover will meet flush and even.

The invention consists of matters hereinafter set forth and more particularly pointed out in the appended claims, and said invention will be more readily understood by reference to the accompanying drawings, in which—

Figure 1:
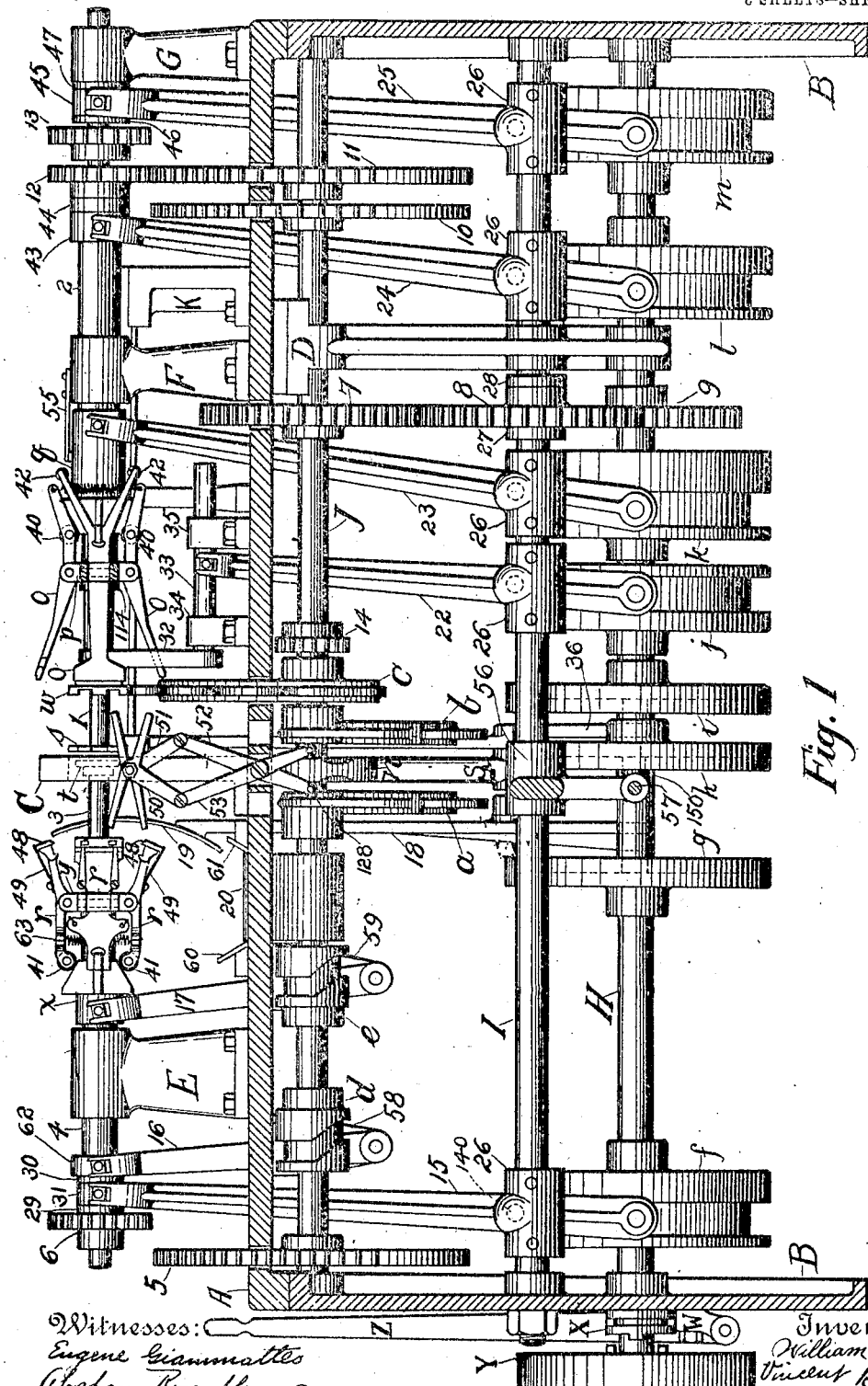
Figure 17:
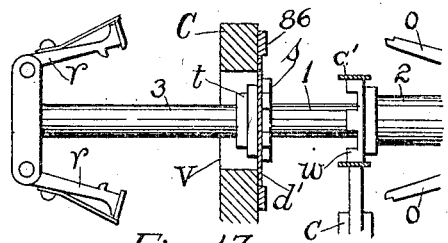
Figure 22:
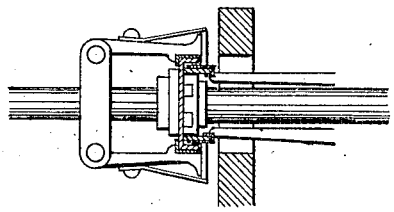
Figure 18:
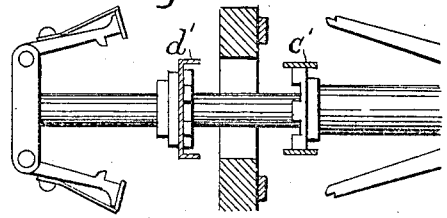
Figure 24:
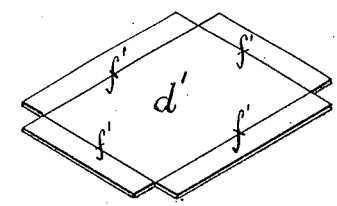
Figure 20:
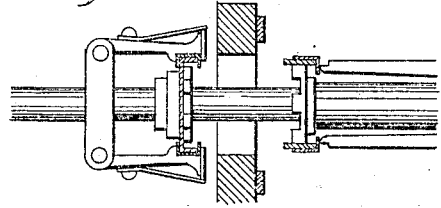
Figure 25:
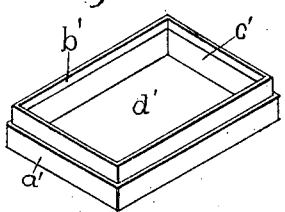
Figure 21:
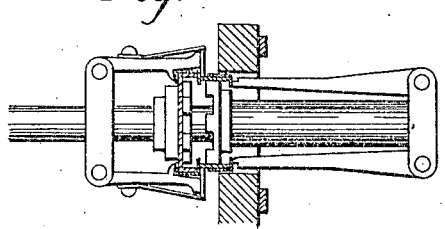
Figure 26:
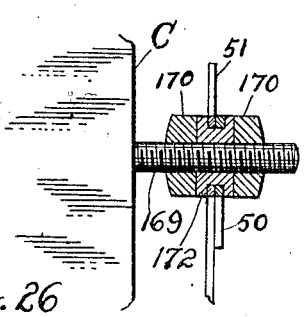

Figure 1 is a vertical sectional view of the machine taken on about the line A' A' in Fig. 2 and Fig. 7; Fig. 2 is a sectional end view of the machine taken on about the line B' B' Fig. 7; Fig. 3 is a perspective view of the bracket arm holding the glue-applying mechanism for the surface finishing strips; Fig. 4 is a sectional end view taken from the opposite side of Fig. 2, and it is taken on about the line C' C' Fig. 7; Fig. 5 is a detailed sectional view showing the feed of the surface finishing strips; Fig. 6 is a perspective, taken from the same side as Fig. 2, showing means for applying paste to the neck before it is inserted in the body; Fig. 7 is a plan view of the machine; Fig. 8 is a perspective showing a detailed construction of the different feeding and wrapping mechanisms embodying our invention; Fig. 9 is a sectional view of the wrapping mechanism both for the neck and the surface finishing paper to be wrapped thereabout; Fig. 10 is a sectional view of the wrapping mechanism for the surface finishing paper to be wrapped around the body; Fig. 11 is a detailed perspective of the body plunger and the neck former, showing the method of fitting together; Fig. 12 is a detailed perspective, taken from the bottom of Fig. 9 on about the line D' D', showing means for holding the neck on its former when wrapped around thereon; Fig. 13 is a cross-section taken from Fig. 12, showing means for locking the ring 117 on the annular groove of the link 32; Fig. 14 is a perspective of the drum which initiates the feeding of the body-blank; Fig. 15 shows a strip for the neck being fed, scored, cut and about to be wrapped on its former, together with the lobed sector working in conjunction with the neck former; Fig. 16 is a detailed sectional view of the lobed sector, taken on the line E' E' in Fig. 15, and showing means for its radial adjustment; Figs. 17–23, inclusive, are views showing the different operations on the components of the box, for the purpose of clearly understanding same: Fig. 24 shows a body-blank; Fig. 25 shows a finished box; Fig. 26 is a vertical, central section of the shears, showing the means for adjusting their distance from the wrapping mechanism.

Figure 19:
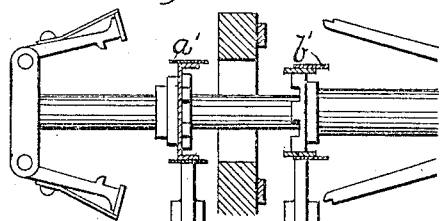

The parts or members which are acted upon by the machine and which finally constitute the finished box are: a body-blank $d'$ Fig. 24, previously scored at $f'$ and the corners cut away, as shown, so that the center portion constitutes the bottom of the box and the side portions constitute the sides, when bent at right angles on the lines $f'$ $f'$ $f'$ $f'$; a strip for the neck, usually of the same material as the body-blank, supplied in a web $c'$ Fig. 3; a strip of surface finishing paper for the sides of the body, supplied in a web $a'$, which is wider than the sides of the body so that, when the strip is suitably wrapped and pasted around them, marginal portions will remain, as in Fig. 19; which portions, on one side, will be lapped over and pasted to the box-bottom and, on the other side, will be lapped over, tucked in and pasted to the inner sides of the box; lastly, a strip of surface finishing paper for the neck supplied in a web $b'$—the marginal portions in this latter case will be needed only on one side, as at $b'$ Fig. 19, which will be lapped over, tucked in and pasted to the inner sides of the neck.

The operations which our machine performs automatically on the above named members and finally produce the result are: to bend the sides of the previously cut and scored body-blank $d'$; to apply suitable paste or glue to one side of the covering strip $a'$; to feed and cut the required length of said strip, to wind it around the bent sides of the body and to bend, overlap and paste, as already described, the protruding marginal portions thereof; to score transversely the strip for the neck at suitable distances, as shown in Fig. 15, which scorings when the neck is bent will constitute the corners of the neck; to apply suitable paste or glue to the secondly mentioned finishing covering strip $b'$, wind and paste it around the neck and overlap, tuck in and paste the protruding marginal portions thereof to the inner sides of neck; to securely fit the neck into the body; and, finally, to eject and carry away the finished box.

The objects of the invention consist in the simplicity of the machine in comparison to the complicated result it produces, and in the new constructions and novel combinations for carrying out the aforementioned functions.

As the machine is designed for rapid manufacturing, it is obviously necessary that the different mechanisms should work simultaneously and converge their respective operations toward the final result. Therefore in the following we have held the description of the mechanisms incidental to the separate steps, apart from each other to more clearly explain the same, and in the description of the operation of the entire machine, we have explained the coöperation between these mechanisms. With this scheme in view, the machine may be considered as consisting of a "body-blank-feeding mechanism"; a "neck feeding, scoring and cutting mechanism"; a "surface finishing strip feed and cutting mechanism"; a "wrapping mechanism for the surface finishing strip on the body"; a "wrapping mechanism for the neck and surface finishing strip therefor"; and a "take-away mechanism".

The different mechanisms involved in the machine may be used independently of each other for useful results, or in combinations with other box-making machines than the one herein described. For instance, the neck feeding, wrapping and finishing mechanism may be used individually and thereafter the finished neck may be inserted in an otherwise finished box, either by hand or any other suitable automatic device; or, eliminating the neck making mechanism, the body alone may be produced which in turn serves as the cover of the box produced in the present designed machine.

The table or plate A, the legs or standards B B, hanger D, and the vertical plate C constitute the framework of the machine.

H is the main shaft upon which are mounted cylindrical cams, $f, j, k, l, m$; the facial house cams, $g, h$, and $i$; and the driving gear 9. Y indicates an ordinary belt pulley loosely mounted on the shaft H and adapted to transmit power thereto through a sliding clutch X adapted to rotate with said shaft and to be thrown in and out of mesh with the pulley Y, by a lever Z, pivoted on the bearing W. I is a tie rod, or stationary shaft, upon which is loosely mounted the gear 8 in mesh with gear 9 and held in place by the two collars 27 and 28 pinned on the rod I. The gear 8, in turn, meshes with a gear 7 mounted on the shaft J; gears 7 and 9 are of the same diameter so that the shaft J will revolve exactly as the main shaft H. Members 26 are sleeves pinned on the tie rod I; they are provided with pins 140 which serve as pivots for levers 15, 22, 23, 24, and 25 which are provided, at their lower ends, with cam rollers which project in, and are actuated by, cam-ways cut in said cylindrical cams $f, j, k, l,$ and $m$ respectively.

56 is a sleeve pinned on the shaft I and is provided with extended arms 146, 147, and 148, the use of which will be made clear.

With reference to Figs. 2, 3, 4, and 7, the surface finishing webs $a'$, $b'$, and the web $c'$, for the neck, are loosely mounted on the same pin shaft 125 mounted on the bracket-arm L, and each web is held in place by the guards 142. The purpose of this positioning of the webs is that the surface finishing strips $a'$ and $b'$ may derive their adhesive property from the same mass of supply held in one glue receptacle M which has two glue-applying rolls 68 and 70 and gear 67 mounted on one pin shaft 126. The receptacle M has two depending lugs 143 which snugly slide in suitable ways 144 so that the said receptacle may be readily removed for cleansing purposes. The periphery of these rolls is equal to one length of the strip which is required to wrap around the box, so that at every revolution of the machine exactly one length will be supplied. The rolls 69 and 71 are mounted on the same pin shaft 127 borne in a journal bearing in the bracket L and serve to support the surface finishing strips against the glue-applying rolls 68 and 70. The shaft 126 is rotated by the gear 67 in mesh with gear 66 mounted on the shaft 124 which is provided with a sprocket-wheel 72, which is rotated through the medium of a sprocket chain belt 73 trained over said sprocket wheel, and a sprocket wheel 131 affixed to the shaft 129. From the glue-applying rolls 68 and 70, the webs $a'$ and $b'$ pass on to channels 133 and 134, respectively, cut out in a standard R, and thence to a reciprocating feed mechanism mounted on said standard, by means of which the gummed strips are fed in relation to the wrapping mechanisms. (See Fig. 8.) This feed comprises a channeled sliding block 100 mounted in guide ways on the standard R and guided downward by the lips 101. The forward portion of the block 100 is centrally and longitudinally slotted, leaving the channels 135 and 136 bounding on either side. Vertical lug 103 rises from the projecting channeled portions and connects said portions transversely, across the said slot in the block 100. The central portion of the vertical lug 103 is engaged by the forked upper portion of the lever 91, whereby the sliding block 100 is reciprocated. (See Fig. 5.) The lever 91 is pivoted on the pin 145 fixed to the projecting arm 146 on the sleeve 56; said lever is actuated by a pusher rod 57 sliding in the sleeve 149 on arm 147 projecting from the sleeve 56; said pusher rod being provided at one end with a cam roller 150 which projects in a cam groove cut on the face of the cam h. Hinged on both ends of the vertical lug 103 and directly above the channels 135 and 136 are the fingers 75 and 95, respectively. The forward portion of the fingers 75 and 95 are forked and provided with the thin toothed wheels 76 and 96 respectively; said teeth, being cut similar to those of a ratchet wheel, are engaged by the light springs 77 and 97, respectively, fastened on the underside of the fingers and serve the purpose of pawls. The web strips a' and b' fed from the glue-applying rolls 68 and 70, respectively, to the channels 135 and 136 of the sliding block 100 are clutched by the toothed wheels 76 and 96 which are tended downward by their own weight. On the forward motion of the sliding block 100 the engagement of the springs 77 and 97 on the toothed wheels 76 and 96, respectively, prevent same from revolving so that the web strips a' and b' are clutched and carried forward by said wheels to the wrapping mechanisms; the ends of said strips are then gripped by their respective mechanisms, so that on the return travel of the block 100, the toothed wheels 76 and 96 are revolved, the springs 77 and 97 yielding thereto. Disposed in the way between the strip feed mechanism and the wrapping mechanisms are the shears for cutting said strips at the required moment.

With reference to Figs. 1, 4, and 8, the shears consist of double pivotal blades 50 and 51, oppositely disposed, having downwardly diverging arms the ends of which are pivotally connected to the ends of actuating levers 52 and 53, respectively, centrally pivoted to each other and provided at their lower ends with cam rollers 128 which engage a cam pathway cut on both faces of the rim of the cam n mounted on the shaft J. Connected at the central pivot of the levers 52 and 53 is one end of the tension spring 99, the other end of which is connected to the bent end of a pin 98 fixed to the underside of the bed A. The members 50 and 51 are pivoted on a flanged collar 172 which is loosely mounted on a threaded pin 169 fixed to the vertical edge of the plate C. (See Fig. 26.) The nuts 170 hold the shears in place. By loosening the nuts 170 and properly manipulating them, the shear-blades may be moved back and forth regulating their distance from the wrapping mechanism, and thereby regulating the length of the surface finishing strips to be cut. The spring 99 tends to close the shear-blades which in their normal position are kept open by the proper width of the rim on cam n. By narrowing both sides of the said rim, of the cam n, at the required point of the revolution of the shaft J, the spring 99 will force downward the levers 52 and 53 thereby closing them on the said narrow portions of the said rim and thereby closing, in a snapping manner, the shear-blades which sever the surface finishing strips a' and b' from the rest of the webs and instantly opening again, due to the resumed width of the rim of the cam n.

The web strip for the neck passes directly from the web c' to the scoring and cutting mechanism mounted on the bearing standard Q. (See Fig. 8.) It comprises an upper drum 89 mounted on a shaft 130 and a lower drum 90 mounted on the shaft 129. In order to drive the drums 89 and 90 the shaft 130 is provided with a gear 64 which meshes with a gear 65, on the shaft 129, which meshes with a gear 54 mounted on the bearing 123 fixed to the underside of the bed A and, the last named gear, in turn is driven by gear 14 mounted on the shaft J. (See Fig. 2.) The periphery of each drum 89 and 90 is equal to the length of the required neck so that, at every revolution of the machine, exactly one length will be supplied. As it is exaggeratedly shown in Figs. 4 and 15, for the sake of clearness, the lower drum 90 is provided with projecting knife edges 171 (projecting about one half of the thickness of the neck material) which are suitably spaced to correspond respectively to the corners of the neck. The first three knife edges which act on the neck strip serve only to score said strip while it is being firmly fed by the drums; the fourth knife edge, which projects the thickness of the strip, severs the already fed and scored strip from the rest of the web. It can be seen that the forward end of the web, immediately following the severed strip, is caught by the drums almost simultaneous with the severing, so that it will take its turn in being fed and scored. From Fig. 15, it can be seen that the distance between the point of tangency of the two drums 89 and 90 and the farthest end, thence, of the forming head w is equal to the length of the neck strip so as, at the same time the strip is severed from the web, its forward traveling end will have taken its required position beneath the forming head $w$. The member $c$ is a sector of a wheel mounted on the shaft $J$ and is provided on its periphery with lobes the profile of which is such that, when the lobes are engaged with and relatively revolving with the former $w$ having a neck strip wrapped thereon, every point on said profile of the lobes will touch every corresponding point on the profile of the neck. The position of the sector on the shaft $J$ is such that, as soon as the forward portion of the neck strip has taken its place beneath the former $w$, the first lobe 132 will have arrived into engagement with the material, gripping it with the neck former. As the strip is engaged between the neck former and the lobed sector, and the latter two begin to revolve, there will be a gearing engagement between them, thereby imparting the same rolling pressure to every portion of the material; (as shown by the dotted lines) always keeping it in a positive grip. By this method we have minimized the possibility of wrinkling the material or creating a tendency of getting it out of true while being wrapped; which fact a pressure wheel, or the like, acting in conjunction with the former, fails to accomplish on account of its friction and rubbing tendency that it has against the former $w$, especially when reaching the corners.

As can be clearly seen from the view, the former $w$ and the lobed sector moving relatively to each other, the first lobe engages one half of the first side; the second lobe, the second side; the third lobe, the third side; the fourth lobe, the fourth side; after which the sector $c$ swings out of the way of operation, while the former $w$ completes one revolution coming back to its former position.

The lobed sector $c$ is capable of minute radial adjustment to suit the different qualities and thicknesses of the material used. This is accomplished as in Figs. 15 and 16. The sector consists of two sections, an upper and lower section; the upper section is provided with the slot 141 which keys on the block 151 projecting from the lower section, and is capable of radial movement thereby. The upper section is provided on its lower portion with an ear 152 which, from above, is acted upon by the set screw 153 in the key block 151 and, from below, by the set screw 154 in the ear 155 extending from the lower section. The screws 156 serve to tighten the two sections after an adjustment has been made; the perforations in the upper section having proper clearance, with respect to the body of the screws 156, so as to permit the same radial movement to the sections as the block 151. (See dotted lines.)

By slightly loosening the screws 156 and properly manipulating the set screws 153 and 154, the upper section of the sector can be set either way, after which the set screws are locked by the nuts 157, and the screws 156 are tightened.

With reference to Figs. 1, 8, 9, and 10; the member 1 is a rotary plunger shaft provided with the plunger head $s$. The plunger shaft 1 is reciprocated through the medium of the lever 25 pivotally acting on sleeve 45 loosely mounted on the shaft 1 and held in place by the collars 46 and 47. The shaft 1 is rotated by gear 13 when at the proper time it is brought into mesh with gear 11 which is an intermittent gear. The member 3 is an axially movable and rotary shaft provided at one end with the clamping head $t$ which acts in coöperation with the plunger $s$. The shaft 3 is reciprocated by means of lever 15 pivotally acting on the sleeve 31 loosely mounted on said shaft and held in place by the collars 29 and 30. The shaft 3 is rotated by gear 6 when at the proper time it is brought into mesh with gear 5 which is an intermittent gear.

The wrapping mechanism for the neck is mounted on the plunger shaft 1 and comprises the hollow shaft 2 provided with the forming head $w$. The said hollow shaft is capable of being reciprocated by means of the lever 24 pivotally acting on the sleeve 43 loosely mounted on said hollow shaft and collared, on one side, by a step on the hollow shaft and, on the other side, by a collar 44. (See Fig. 9.) The said hollow shaft admits of being rotated by gear 12 mounted thereon, when at the proper time it is brought into mesh with the intermittent gear 11 or similar gear 10. The hollow shaft 2 acts as a journal bearing for plunger shaft 1 and is itself journaled in the bearing standard F. The remaining portion of the shaft 1 which extends beyond the hollow shaft 2 is journaled in the bearing standard G. It is clearly understood that the plunger shaft 1 and the hollow shaft 2 are governed by different means and act independently of each other. The forward portion of the neck strip $c'$ having reached its proper place underneath the forming head $w$ and having been clamped thereto by the oncoming lobe 132 on the sector $c$, the gear 12, at this point, engages with a set of teeth on the intermittent gear 11 thereby rotating hollow shaft 2 with forming head $w$ relatively with sector $c$ and wrapping the neck strip about the forming head $w$. To keep the forward end of the collar strip properly on to former $w$ while it is being wrapped thereabout, and to keep the last portion of the said strip on the former $w$ after having been wrapped thereabout, we have arranged the following means, referring to Figs. 1, 9, and 12. The member 32 is a vertical link attached at its lower end to an axially movable shaft 33 splined with bearings 34 and 35 mounted on the bed A. The shaft 33 is reciprocated by means of the lever 22 pivotally acting on pins laterally extending on said shaft. The upper portion of the link 32 is perforated to slide loosely on the hollow shaft 2, and is provided with a hub having an annular groove upon which is fitted the collar 117. That portion of the collar which is nearest to the corner of the former $w$ where the two ends of the neck strip meet is provided with pairs of suitable projecting ears to which are hinged two pressure fingers 118 and 120 which are tended toward the former $w$ by the two springs 119 and 121, respectively, pinned on the ends of the ears of the collar 117. (See Fig. 12.) As can be seen, the finger 118 which grips the forward end of the collar strip $c'$ is longer than the finger 120 which grips the last end portion of the collar strip. In its normal position, the finger 118 is held disengaged from the former $w$, in about the position shown in Fig. 9. The spring 119 keeps the said finger so that the engaging surface is flushly alined with the surface of the former $w$; so when the link 32 pushes the finger and forces its rounded end to slide over the neck strip, the thickness of the strip, to which the finger has to yield, is sufficient to develop required pressure against the spring 119 so as to be tightly held by the finger 118. When the forward end of the neck strip $c'$ has reached its required position underneath the former $w$ and the oncoming lobe of the sector $c$ has clamped it thereto, by the proper inclination of the cam groove in the cam $j$, the lever 22 is slightly actuated forward (in this case about $\frac{1}{8}''$) so that the finger 118 will slip over the forward end of the neck strip sufficiently clamping it on to the former $w$. As the former $w$ rotates, with the neck strip clamped by finger 118, the collar 117 rotates with it; and when it has reached the point where the last side of the neck is bent over the former $w$, the link 32 moves forward an additional distance (equal to about $\frac{1}{4}''$) thereby slipping the finger 120 over the last portion of the neck, clamping it on to the former $w$. As shown in Fig. 13, the collar 117 is provided with a small socket into which is placed the pin 159 with one end rounded which fits in a corresponding rounded indenture in the annular groove of the link 32. The pin 159 is forced against the said annular groove by the small compression spring 160. The purpose of the pin 159 is to lock the ring 117 so that after the said ring has completed a revolution, together with the former $w$, the pin registers and locks the ring always in a constant place. As can be understood from Fig. 15, when the last side of the neck strip is bent over the former $w$ by coming between the third and fourth lobe of sector $c$, and the fourth lobe begins to engage the said side against the last side of the former $w$, at about this time, the link 32 moves the finger 120 into engagement with said side. At this point it is not necessary that the fourth lobe should engage the whole of the last side of the neck, since it is properly gripped by the finger 120, therefore the last portion of the fourth lobe is cut away (as shown) so that it may clear the finger 120 when swinging past it; and there will be no more engagement, between the lobed sector and the neck, for the rest of the revolution of the former $w$. The neck is now ready for the wrapping of the surface finishing strip. So by the required curve of the cam groove in the cam 1 the lever 24 advances forward, positioning the former $w$ directly above sector $b$, and at the same time bringing gear 12 into mesh with a set of teeth on the intermittent gear 10. At the same time the finishing paper feed will have brought the forward end of the finishing strip $b'$ underneath the former $w$, the oncoming lobe of sector $b$ gripping and pasting it to the bottom side of the wound neck,—in the same manner that the oncoming lobe of sector $c$ formerly acted with the neck strip $c'$ and former $w$.

Working simultaneously with the wrapping of the neck strip $c'$, on the former $w$, is the body-blank feeding mechanism, feeding the body-blank $d'$ between the plunger head $s$ and the clamping head $t$; so that by the time that the neck strip is wound, around the former $w$, the body-blank will be positioned and clamped between said plunger head $s$ and clamping head $t$. (See Fig. 17.) The body blanks $d'$ are held in a receptacle P which is supported, at one end, by the plate C and, at the other end, by the standard K. The receptacle P is provided with a follower 106 on both sides of which are fastened the cords 109 which pass over and under the pulleys 108 and fastened to one end of the tension springs 107, the other end of which is fastened to the receptacle P. The blanks are fed, one by one, by a reciprocating plate or disk 87 working between the guideways 86 screwed on the plate C. In practice, we have found in such feeds for blanks, as the one we have described, that often, due to the unevenness of certain blanks or to the varied pressure from the follower 106, the feed disk 87, instead of positively engaging with the first blank next to the plate C, edges itself between the two, thereby failing to feed and to satisfy the rest of the machine. At other times, the feed disk engages with the first two blanks, endeavoring to feed them both; but since the space between the outletting side of the receptacle and the plate C will not permit the passage of two blanks, there usually occurs some damage to the two said blanks engaged by feed disk 87, thereby causing a delay in the operation of the machine—due to stoppage and adjustment. We have minimized this objection by having the front edge of the feed disk 87 extend a short distance in front of the stack of blanks (shown by dotted lines in Fig. 8) and feed the first blank up to that point, by a cylindrical drum T, after which the feed disk 87 will feed the rest of the way. The drum T is positioned in the aperture 138 in the vertical plate C and in front of the center portion of the first blank so that said blank will be tangent to the circumferential surface of the drum. The drum T is provided on its circumferential surface with vertical rows of small projecting points. (See Fig. 14.) The said rows, which are spaced apart from each other, alternate with the intervening blank spaces left on said drum, so that when one of these rows of points will have engaged the front surface of the first blank and will have fed forward the said blank the width of the row, the blank space on the drum T, following the engaged row of points, will present itself to the surface of the body-blank. At this point, the blank may be fed the rest of the way by the feed disk 87 without engaging with or being damaged by any of the projecting points which have revolved out of contact from said surface of blank. The position of the drum T before feeding the blank is such that the middle of one of the blank spaces, on the drum, will be tangent to the body-blank, in which position the projecting points bounding either side of said blank space are out of contact with the tangent body-blank. Each movement of the drum T consists of the remaining half of the first blank space, a row of projecting points, and half of the following blank space, as shown from $t'$ to $t'$ Fig. 14. This brings the drum in a position similar to its previous one, so that the blank may be fed freely the rest of the way by feed disk 87 and said disk may return without engaging with said points.

The drum T is fixed on the shaft 88 which is vertically journaled in the plate C. The shaft 88 is intermittently rotated by a bevel gear 84 mounted thereon and accommodated in the aperture 139, in the plate C, below the aperture 138. This gear is in mesh with bevel gear 85 on one side of the plate C and mounted on the shaft 160 journaled, in the plate C, perpendicularly to the shaft 88. The shaft 160 is provided, on the other side of plate C, with a ratchet wheel 38 which is actuated by pawl 37 pivoted on the lever 36. The position of the pawl 37 in relation to the teeth of the ratchet wheel 38 must be such that while said pawl is moving forward in engagement with the tooth 152, it will be gradually raised by the next coming tooth 153 until it will be totally disengaged from the tooth 152 and will travel the rest of its movement without actuating said ratchet wheel; which member, thereafter, will be kept in place by stationary pawl 39 which acts under tension spring 83. In this case, the thickness of the ratchet wheel 38 is equal to the combined thicknesses of the acting pawl 37 and the stationary pawl 39. The peripheral distance which the ratchet wheel 38 will have advanced, from the time that pawl 37 commences to engage tooth 152 to the time when it is totally disengaged by tooth 153, is equal to the peripheral distance which the drum T will have advanced thereby. This distance is equal to one half the width of a blank space plus the width of one row of points plus one half the width of the next blank space, as from $t'$ to $t'$ in Fig. 14.

The lever 36 is pivoted to the pin 161 fixed to the hanger S fastened to the underside of the bed A. The said lever is provided, at its bottom end, with a cam roller 162 which projects in a cam groove on the face of the cam $i$. The upper part of the lever is provided with an aperture 163, the horizontal dimension of which is equal to the movement that is taken up by the ratchet wheel 38 from the time pawl 37 commences to engage tooth 152 to the time it is totally disengaged by tooth 153.

The movement of the above feed mechanism during the feed of one body-blank is as follows: By the proper run in the cam-way of the cam $i$, at the beginning of the revolution of the machine, the top of the lever 36 is actuated forward toward the wrapping mechanism. The pawl 37 engages the ratchet wheel 38 rotating the shaft 160 and bevel gear 85 thereon which meshes with gear 84 thereby rotating the drum T. The projecting points of one of the rows on the drum revolve into engagement with the first blank and carry it forward the width of said row, after which the vacant space following said row presents itself to the surface of the blank until its center is tangent thereto. At this point the pawl 37 is totally disengaged from the ratchet wheel 38, and the rear surface of the opening 163, which has reached and engages with the pin 164 on the feed disk 87, brings forward the feed disk which feeds the partially fed blank the rest of the way to its required position between the plunger head $s$ and the clamping head $t$. The body-blank is now ready to be passed through the aperture V in the vertical plate C.

The length and width of the aperture V are equal, respectively, to the length and width of the center portion of the body-blank plus twice the thickness of the blank; so that when a blank is passed through said aperture the side portions thereof will be folded on the scorings $f'$. The body-blank having been suitably fed between the plunger head *s* and the clamping head *t*, by the proper curves of the camways in the cams *m* and *f*, the levers 25 and 15 are coöperatively actuated and said heads clamp the blank and pass it through the aperture V, positioning said blank with its bended sides directly over the lobed sector *a*. In the same time the finishing paper feed will have brought the forward end of the surface finishing strip *a'* between the bent body-blank and lobed sector *a*, the oncoming lobe of which will immediately grip said strip and paste it on the lower bent side of blank,—in the same manner that the oncoming lobe of the sector *c* acted in the case of the neck strip and neck former. This movement of the shafts 1 and 3 through the medium of the levers 25 and 15, respectively, will have brought the gear 13 into mesh with a new set of teeth on the intermittent gear 11 on the shaft J, which gear has been simultaneously evacuated by gear 12; while gear 6 is brought into mesh with a set of teeth on gear 5 on the shaft J.

The lobed sectors *a* and *b* are similar in principle and all respects to the lobed sector *c*, which has already been described, except that the fourth lobe on the sectors *a* and *b* are left complete, and not cut away as in the case of sector *c*, and in addition there is a fifth lobe. (See lobes on sectors *a* and *b* in Figs. 4 and 2.) Hence, when the lobed sectors *a* and *b* revolve in relation, respectively, with bent body-blank and wound neck, for wrapping the surface finishing strips thereon, the whole of the third side and the remaining half of the fourth will be engaged, thereby engaging and pasting the surface finishing strips for the entire revolution of the body-blank and wound neck; after which the said sectors swing out of the way of operation.

With reference to Figs. 1, 8, and 9, *p* is a collar loosely mounted on hollow shaft 2 and held in place, on one side, by a step on said shaft and, on the other side, by the collar 114. (See Fig. 9.) The said collar *p* is provided, on those portions corresponding to the sides of the neck, with projecting ears (two ears for each side) within which are centrally pivoted pairs of opposite arms *o*. The novelty of these arms consists in the fact that they perform three consecutive operations, to wit: that of bending the protruding marginal portions of the surface finishing strip wound on the neck; to tuck in and paste said marginal portions to the inside of the neck; and to force the finished neck into the body, including their adaptation of undergoing all of the required functions which tend to the result of the above mentioned operations. In this manner we eliminate several separate mechanisms which would otherwise have to be congested in such a limited space of operation. The description of one of these arms will apply to the remaining three, as they are all similar to each other. One end of the lever *o* has the form of a T and the front upper edge thereof is cut away, as shown, to form a step. The purpose of this step is: that when the arm *o* closes, the front edge of the lower step thereof bends the protruding marginal portion on the neck (see Fig. 20) and when, at the proper time, the arm *o* is pushed forward, the said bent marginal portion is tucked within the neck until the forward edge of the second step on the arm *o* reaches the edge of the neck. The forward edge of the second step, by a further forward traveling of the arm *o*, pushes the neck within the body. (See Fig. 22.)

It must be understood that, on one pair of opposite arms *o* the width of the front edges, which engage the marginal portions on the neck, is equal to the length of those sides they engage; while on the other pair of opposite arms the width of the front edges is equal to the length of those sides they engage less the combined thicknesses of the front edges of the first mentioned pair. The purpose of this is that when the four arms close together, the front portions of one pair of arms come within those of the other pair, thereby completing a perfect rectangle with sharp corners which can after be inserted into the neck for tucking in the bent marginal portions thereof.

The rear portion of the arm *o* branches into two extending fingers the ends of which are perforated for the attachment of one end of springs 42 the other ends of which are attached to perforations in the similar extended fingers of the opposite arm *o*; these springs give an equal tension to both opposite arms and force them to remain in an open position. Near the meeting point of, and within, the rear projecting fingers of the arm *o* is situated the cam roller 40. It can be seen from Figs. 1, 2, 9, and 12, that the link 32 is provided on its body with a wide vertical slot 137, so as to permit the narrow portion of the undermost arm *o* to work freely in said slot and the arm may be closed and opened without interfering with said link.

The member *q* is a sliding sleeve mounted on the hollow shaft 2 and is provided at one end with four cam lugs situated to engage the four cam rollers of the four arms *o*. The cam sleeve *q* is reciprocated by lever 23 the upper portion of which pivotally engages suitable projecting pins on the said sleeve. The sleeve *q* is provided at its upper part with a keyway in which engages the key 55 fastened on the upper side of the bearing F, so as to permit only axial movement to the said sleeve. As can be seen by the figures, the rear extended fingers of the arms *o* are so far apart as to allow a clearance for the back and forth movement of the cam sleeve *q*; and the springs connecting one pair of arms are situated within those springs connecting the other pair of arms, so that they may close and open without interfering with each other. The cam lugs on the sleeve *q* are inclined so as to give a closing motion to the arms *o* when it is moved toward the neck, and vice versa. The motion of the four arms *o* during one complete forward motion of the cam sleeve *q* is as follows: As the cam sleeve *q* is actuated forward by means of the lever 23 oscillated by the proper inclination of the camway in the cam *k*, the four arms *o* are gradually closed until their forward edges are about to engage the protruding marginal portions of the neck; at this point the inclination of two opposite cam lugs is discontinued so that the two opposite arms engaging such lugs remain stationary, while the other pair of arms keep on closing until the two marginal portions engaged by them are completely bended; at this point the inclination of these lugs is discontinued keeping the arms in their assumed position, while the inclination of the former two lugs is resumed, thereby closing the arms engaged on such lugs until the two marginal portions engaged by said arms are completely bended. It can be seen that the reason for this is to first bend two opposite marginal portions and then the other two, so that the latter two can properly overlap the former two at the corners of the neck; otherwise, if the four arms closed together, there would be a wrinkling effect of the surface finishing strip at the corners, since no side thereof would have a chance to bend before another to be properly overlapped thereby.

With reference to Figs. 7 and 8, two pairs of opposite lugs of the collar *p* are longer than the rest, and to these are fastened two sliding sleeves 115 and 116. These sleeves slide, respectively, on rods 113 and 112 the former of which is fastened at its ends to two upright standards 110 mounted on the bed A; the latter is fastened, at one end, to the upright standard 111 mounted on the bed A and, at the other end, to a hub 122 projecting from the standard R. It can be seen that the sleeves 115 and 116 are suitably long and located in the axial plane of the hollow shaft 2, so as to insure both a substantial bearing upon which the collar *p* and arms *o* may be reciprocated and no possibility of any other motion but an axially reciprocating one.

With reference to Figs. 2, 4, 6, and 7, the member N is a glue receptacle with the glue applying roller 79 mounted on the shaft 165 upon which is also mounted the cam 93 and a sprocket wheel 92. The shaft 165 is revolved through the medium of a chain belt 74 trained over sprocket wheel 92 and sprocket wheel 94 mounted on the shaft 130. 81 is a bell crank lever pivotally attached to vertical plate C. One arm of the lever 81 is provided at its end with a small glue applying roller 82; the vertical arm is provided with a cam roller 102; and the third arm is perforated at its end for fastening one end of tension spring 80, the other end of which is hooked on the turned end of a pin 78 fastened to the receptacle N. The glue applying roller 82 is given a vertical oscillation by means of the cam roller 102 held against the cam 93 by tension spring 80.

When the neck former *w* with the wound neck strip has moved forward and taken its place above the sector *b* (as already mentioned) and the surface finishing strip *b'* is clamped between, and the neck begins to wind thereon said surface finishing strip, by a sudden recess in the cam 93, the bell crank lever 81 is given sway to the pressure of the tension spring 80. The small glue applying roller 82, the periphery of which has been smeared with glue from its former contact with glue roller 79, comes into contact with the upper side of the neck; applying a streak of glue thereon (in this case about ⅛" wide) nearest to that edge which has no protruding marginal portions, as shown by the dotted lines in Fig. 6. The roller 82 is not left on the upper surface of the neck until it reaches the corner portion thereof, for its purpose only serves to apply a short thin streak of glue on about the center of said side of neck, leaving about one quarter of the length vacant at each end; the purpose of said streak of glue being to securely adhere the neck into the body when inserted therein. Therefore, when about nearing a corner, by a sudden rise on the cam 93 the cam roller 102 is actuated to its former position, thereby bringing the roller 82 back into engagement with the roller 79 until the oncoming corner of the neck is swung by and the next side is offered. At this point cam 93 offers another recess to the roller 102 and the spring 80 swings the bell crank lever 81 bringing roller 82 into action against that side of the neck. This goes on for the four sides, after which the cam roller 82 is kept in place against the roller 79 by cam 93 for the rest of the following movements of the machine. The collar is now ready to be inserted into the body.

The mechanism for bending the marginal portions of the surface finishing strip on the body is similar in principle as the one for the neck, and differs in the details of construction which will be made clear.

With reference to Figs. 1, 8, and 10, the member 4 is an axially movable hollow shaft provided at one end with a collar *y* having on those portions corresponding to the sides of the box, projecting ears (two ears for each side) within which are centrally pivoted the opposite pairs of arms r. The hollow shaft 4 is axially reciprocated by means of lever 16 whose upper portion pivotally engages extending pins on collar 62 mounted on hollow shaft 4. The lower end of lever 16 is pivoted to the hub of the hanger 58 fixed to the under side of bed A. The lever 16 is provided with a cam roller, at the required distance from the pivotal point, which extends into a cam groove in the cylindrical cam d mounted on the shaft J. Again, as in the case of the arm o, the description of one arm r will apply to the remaining three as they are all similar to each other.

It will be remembered that the body has the protruding marginal portions of the surface finishing strip left on both sides, as at a' Fig. 19, so that the forward portion of the arm r, at its lower side, is provided with a channel the width of which is equal to the width of the sides of the body. The front side of said channel consists of a sliding plate 48. This plate is provided with two quadrilateral perforations 167 working on two quadrilateral projections on the end of the arm r, which allow only an edgewise sliding movement to the plate 48. The said projections are provided with cross-heads 168 to guide the sliding plate 48 against the end of the arm r. The plate 48 is tended down, in the position completing the channel, by two flat springs 49 which engage the upper portion thereof and are attached to the arm r. The springs 49 are sufficiently strong, so that when the arm r closes on the protruding marginal portions on the body, the side of the channel integral with the arm r will bend the marginal portion on one side, and the side of the channel consisting of the sliding plate 48 will bend the marginal portion on the other side, without yielding thereto; the purpose of having said side of channel consist of a sliding plate will be made clear later on.

The rear portion of the arm r differs from that of the arm o in the fact that, instead of having the two diverging fingers, it takes the shape of a cross. The ends of the cross-arm thereof are perforated to which are fastened one end of the springs 63 the other ends of which are fastened to the perforation in similar cross-arms in the opposite arm r. The end arm of the cross is forked and admits the cam roller 41. The member x is a sliding sleeve mounted on the hollow shaft 4 and provided at one end with four cam lugs situated to engage the four cam rollers 60 of the four arms r. The sleeve x is reciprocated by means of a lever 17 the upper portion of which engages suitable extending pins on the said sleeve. The lever 17 is pivoted at its lower end to a hanger 59, and is provided with a cam roller, at the required distance from the pivotal point, which extends into a cam groove cut in the cam e. (See Fig. 4.) As can be seen by the figures, the cross-arms of the rear section of the arm r are long enough to allow a clearance for the back and forth movement of the cam sleeve x between the springs 63; and that the springs connecting one pair of arms are situated within those connecting the other pair of arms, so that they may close and open without interfering with each other.

The movements of the arms r during one complete forward movement of the cam sleeve x are similar to those of the arms o. It must be understood that, as in the case of the arms o, the front portions of a pair of opposite arms r must be less than the length of those sides which they engage for bending the protruding marginal portions thereon, so as to give access to the other pair of arms for bending the marginal portions on the other two sides.

When the neck is inserted into the body, it is obvious that the neck former w, in some way, must fit over the plunger head s in order to be able to bring the neck up to the box-bottom; therefore on the head s and former w, portions must be cut out complementary to each other so that said head s and former w may fit together as required. We have accomplished this as shown in Fig. 11. The plunger head s has its corners and portions from the middle of the sides cut out, and the former w has a shape complementary to that of head s cut out on its front face. The reason for this is that in winding the collar strip around the former w, the corners of said former are necessary for properly bending the corners of the collar strip; also the center portions left in Fig. 11 are necessary to keep the sides of said strip from caving in when wrapping the surface finishing strip thereon. However, in the case of the plunger head s, the sides of the body being integral to the bottom, the corners and center portions of said head are not absolutely necessary and therefore may be dispensed with for the sake of accommodating the former w; the two portions left for each side, as in Fig. 11, being sufficient to keep the sides of the blank from further bending over when wrapping the surface finishing strip thereon. The length and width of the plunger head s are equal, respectively to the length and width of the center portion of the body-blank d' less twice the thickness of the neck strip, so that when the neck is inserted into the body, it will freely fit and pass over the head s in order to reach the box-bottom.

With reference to Figs. 1, 4, and 7, the member 20 is an endless moving apron situated beneath the place where the box is completed so that the finished box may fall thereon. Said apron is trained over a roll 21 suitably mounted on a pin shaft fixed in an aperture in the bed A; roll 105 mounted on a pin shaft fixed between the bearings 104 projecting from the bed A; and a roll mounted on the shaft J, which roll drives the said apron. The circumference of the last mentioned roll is sufficiently large so as to allow the apron 20 to advance, at least, the length of a box at every revolution of the shaft J. The plates 60 and 61 serve to guide the finished box on apron 20 until it reaches the side of the bed whence it will fall into a suitable receptacle.

Member 19 is a curved plate which acts as a chute for the finished box when falling from the arms r to the apron 20. (See Fig. 23.) The chute plate 19 is intermittently oscillated, at right angles to the clamping head shaft 3, by a lever 18 upon which it is mounted. The lever 18 is pivoted on a pin 173 fixed to the arm 148 extending from the sleeve 56; and, said lever, is provided at its lower end with a cam roller 174 which projects in a camway in the face of the cam g.

Having described the different mechanisms separately we will now describe the operation of the machine as a whole during one revolution of the main shaft H, in which time a complete box is made.

Before the beginning of the revolution, the machine finds itself in the position of Fig. 1. The forward end of the neck strip is positioned underneath the forming head w; which position was attained during the preceding revolution. The surface finishing strips a' and b' are positioned in the channeled feed block 100 and gripped by the clutch fingers 95 and 75 respectively. The forward ends of the surface finishing strips extend sufficiently beyond the block 100 so that when said block feeds the ends of the strips to the wrapping mechanisms, there will be a free portion to present thereto and gripped thereby. (See Fig. 5.) The hollow shaft 2 is positioned with the former w directly above the lobed sector c, and the gear 12 about to be engaged with a set of teeth on the gear 11. As the revolution commences, the lobe 132 on the sector c clamps the forward portion of the collar to the former w and, simultaneously with this movement, the finger 118 is moved forward by the link 32 thereby clamping the forward portion of the neck on former w. Hollow shaft 2 revolves in coöperation with sector c, winding thereabout the neck strip and carrying with itself the finger 118 mounted on the collar 117 which revolves in the annular groove in the hub of link 32. Arriving at that point of the revolution where the last side of the collar strip is bent, the link 32 makes an additional forward movement thereby clamping the finger 120 on the last bent side of the collar strip; the wound collar being held on the former w by said fingers, the sector c immediately swings out of engagement therefrom.

Working simultaneously with the wrapping of the collar is the body-blank feeding mechanism. As already described in details, at the beginning of the revolution the lever 36 is actuated by the cam i, thereby engaging pawl 37, with the ratchet wheel 38 thereby revolving the drum T. The first body-blank is moved forward by the engaging row of points on said drum to the required point where the feed disk 87 will take up the feeding of the blank, and the drum T will keep on revolving until the center of the following vacant space will offer itself tangent to the surface of the blank. At this point the pawl 37 will have been disengaged, the drum T stops moving, and the feed disk 87 will be actuated forward through the medium of the projecting pin 164 coming into contact with the rear edge of the aperture 163 in the lever 36. The body-blank is finally fed between the plunger head s and the clamping head t. At this point the machine finds itself with the collar wound around its former and the body-blank fed between the said heads. (See Fig. 17.) By similar inclinations in the cam grooves in the cams f and m the levers 15 and 25, respectively, are coöperatively oscillated forward causing the plunger head s and the clamping head t to clamp the body-blank and pass it through the aperture V in the vertical plate C; bending the scored sides thereby and bringing the bent body-blank directly above the lobed sector a. In the same time with the last mentioned operations, an inclination of the cam groove in the cam l will actuate lever 24 forward and thereby hollow shaft 2 with the arms o; bringing the former w with the wound neck directly above sector b. (See Fig. 18.) It must be understood that there must be a precise corresponding inclination in the cam grooves on the cams j and k as the one in the cam l, so that when the lever 24 is oscillated forward by its cam, the lever 22 must be likewise oscillated so that the link 32 will maintain its position in relation to the former w, keeping the fingers 118 and 120 clamped on the wound neck through the forward movement of same. The lever 23 must also be oscillated forward, keeping the cam lugs on the sleeve q in their normal position relative to the arms o, keeping them open during the forward motion of same. It is also understood that the swinging of sector c out of the way, immediately after its required function, makes its possible for the opened arms o to travel through the cleared space. The end of this movement will find gear 6 on the shaft 3 directly above the intermittent gear 5 and about to mesh with a set of teeth thereon; gear 13 on shaft 1 directly above intermittent gear 11 and about to mesh with a set of teeth thereon; and gear 12 on hollow shaft 2, which has just evacuated gear 11, will be set directly above gear 10 and about to mesh with a set of teeth thereon. Working simultaneously with said traveling of neck and body-blank is the surface finishing paper feed. By proper inclination of the cam groove on the face of the cam $i$ the lever 91 is oscillated forward carrying the block 100 therewith and offering the extended forward portions of the strips $a'$ and $b'$, respectively, to the undersides of the bent body blank and neck, until half of the distance of said side has been reached. At this point the rounded portions of the oncoming lobes of the sectors $a$ and $b$ swing into position pressing and pasting the forward ends of the webs $a'$ and $b'$, respectively, to the undersides of the bent body-blank and neck. By an opposite inclination of the cam groove in the cam $i$ the lever 91 is oscillated backward bringing the channeled block 100 to its former and normal position, and leaving the fed webs gripped by their respective mechanisms.

Immediately after the fed webs $a'$ and $b'$ are gripped by the sectors $a$ and $b$, the gears 6, 12, and 13 mesh respectively with gears 5, 10 and 11 and revolve, causing the body, clamped by clamping head $t$ and plunger head $s$, to revolve coöperatively with sector $a$, wrapping the surface finishing paper thereabout; and the neck on the neck former $w$ to revolve coöperatively with the sector $b$, wrapping the surface finishing strip $b'$ thereabout. Working in connection with the wrapping of the surface finishing strip around the neck is the following: The neck winds the surface finishing strip until the fourth side is reached where the finger 120 holds clamped the last portion of the neck on the former $w$. As the beginning of the fourth lobe of the sector $b$ clamps the said side on the former $w$, wrapping and pasting the finishing strip thereon, the finger 120 is no longer necessary, so by a slight backward movement of the lever 22 the link 32 relieves that side of the neck from finger 120 thereby clearing that side for the pasting of the surface finishing strip. When the strip $b'$ has reached the last corner of the neck where the two ends meet, and the last lobe on sector $b$ has engaged the remaining half of the first side, before said lobe reaches the finger 118 holding said side to neck former, the lever 22 makes another slight backward movement relieving said side from finger 118 and making room for the end of the surface finishing strip $b'$. (See Fig. 19.)

As can be seen from Fig. 8, the distance between the shears and the edges, nearest thereto, of the wrapping formers is about the length of one side of the box. Hence, as soon as the surface finishing strips have been wound the length of three sides of the box, by the sudden recess on the sides of the rim of the cam $n$, the shear members 50 and 51 are suddenly snapped close by spring 99 thereby cutting the surface finishing strips; quickly opening again by the cam $n$ which has resumed its proper width.

While the neck begins to wind thereon the surface finishing strip $b'$, the glue applying roller 82 on the bell crank lever 81, is given intermittent vertical oscillations by means of the cam roller 102 forced by spring 80 against the cam 93, and thereby applying a streak of glue on each of the four sides of the neck (as already specified in details). At this point of the revolution of the shaft H the machine finds itself with the body-blank folded and with its surface finishing strip $a'$ wrapped and pasted thereabout; while the neck has been wound around the former $w$ and its surface finishing strip $b'$ wrapped thereabout, and also having center portions on its sides, near the edges, smeared with thin streaks of glue so that when it is inserted in the body it will be firmly adhered thereto. (See Fig. 19.) It is understood that the sectors $a$ and $b$ swing out of the way of operation immediately after doing their required functions. Hence, by the proper inclination of the cam groove in the cam $k$ the lever 23 is oscillated forward thereby causing the lugs on the sliding sleeve $q$, by engaging with the cam rollers 40, to gradually close the arms $o$; first closing two opposite arms and then the other two, as already described, thereby bending the marginal portions and properly lapping them at the corners. In the same time, by proper inclinations of the cam grooves in the cams $d$ and $e$ the levers 16 and 17 are oscillated forward thereby bringing hollow shaft 4 with the levers $r$ in a position where the channeled portions of said levers may be closed on the sides of the body in order to bend the protruding marginal portions. At this point the inclination of the cam groove in the cam $d$ discontinues and the arms $r$ stop from traveling; while the cam groove in cam $e$ continues thereby oscillating the lever 17 still forward, making the cam lugs on the slide sleeve $x$, in contact with rollers 41, close the arms $r$,—two at a time as already described. This point of the revolution of the shaft H brings the machine with the surface finishing strips wrapped around the body and neck, and with their protruding marginal portions bent. (See Fig. 20.) By proper inclination of the cam grooves in the cams $k$ and $l$ the levers 23 and 24 are oscillated forward coöperatively, so as to keep the arms $o$ in their closed position. Thereby the neck is brought forward, passing through the aperture V in the plate $c$ until its edges reach the bent marginal portions on the body. (See Fig. 21.) Immediately preceding this point the lever 16 is slightly brought back by the cam $d$ thereby causing the cam lugs on sleeve $x$ to recede and allow the arms $r$ to slightly open, so as to allow the neck to enter within the body. The traveling neck, which has reached the bent marginal portions on the body, enters within thereby tucking in the bent marginal portions of the body, while the arms $o$ tuck in the bent marginal portions of the neck. The neck keeps on traveling until its forward edge reaches the surface on the bottom of the body. (See Fig. 22.) It must be understood that when the neck reaches the position shown in Fig. 21 and begins to enter the body, either the marginal portion of the body or that of the neck may give away first to be tucked in,—depending to which has the strongest material. But that is of little consequence, for as former $w$ travels up to the bottom of the box and, thereby, the forward edges of the arms $o$ are brought the required distance within the neck, both the marginal portions of the body and those of the neck will finally be tucked in, as in Fig. 22. At this point, the sliding sleeve $x$ makes a slight forward movement thereby slightly closing the arms $r$ and giving a final forming pressure on all sides of the body and neck. On this account, the plates 48 come against the resistance of the plunger head $s$ and the former $w$, which have come together, and therefore must yield thereto against the springs 49. This is the only use of the sliding plates 48, otherwise the channels on arms $r$ could be integral. In the same time the sliding sleeve $q$ makes a slight backward motion, opening slightly the arms $o$ thereby giving a final sticking pressure to the tucked in portions of the neck.

By precisely similar inclination of the camways in the cams $k$, $l$, and $m$, the levers 23, 24, and 25, are oscillated backward, and the plunger head $s$, the former $w$ and the arms $o$ recede; retaining their already assumed positions. When the plunger head $s$ arrives at its position, shown in Fig. 1, the inclination of the cam groove in cam $m$ is discontinued and the plunger head $s$ remains stationary; while the former $w$ keeps on traveling until it has reached its normal position above the sector $c$ and above the forward portion of the neck strip (which by this time has been fed thereto by the drums 89 and 90); at which point the former $w$ remains stationary and the sliding sleeve $q$ will keep on traveling until the arms $o$ are snapped open.

Figure 23:
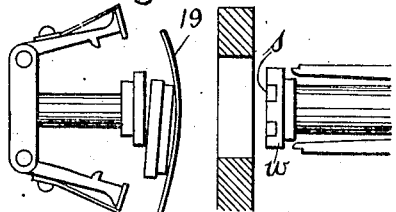

During the time that the plunger head $s$ and former $w$ recede to their normal position, by similar inclinations of the cam grooves in the cams $f$, $d$, and $e$, the levers 15, 16, and 17, respectively, are oscillated backward; the arms $r$, clamping head $t$ and sliding sleeve $x$ recede to the position shown in Fig. 23, retaining their assumed positions and bringing with them the finished box still gripped within the channels of the arms $r$. By an inclination of the cam groove in the cam $g$ the lever 18 is oscillated, positioning the chute plate 19 in front of the box. At this point, through the cam $e$, the lever 17 is oscillated making the cam $x$ recede, thereby permitting the levers $r$ to open; at the same time, through cam $f$, the lever 15 is oscillated a short distance forward, moving the clamping head $t$. By which movement, the finished box is impelled forward striking the chute plate 19 and sliding thereon to the take-away apron 20. (See Fig. 23.) By an opposite inclination of the camway in the cam $g$ the lever 18 is oscillated backward carrying the plate 19 to its former position; and by the resumed inclination of the camway in the cam $f$ the lever 15 is again oscillated forward, carrying the clamping head $t$ to its normal position, shown in Fig. 1, thereby completing the revolution of the shaft H.

It is understood that most of the operations which take place after the box is finished occur simultaneously; and on account of doing no useful work, except to let the different parts resume their normal positions, they are quick and snappy, occupying only a small part of the revolution of the shaft H.

It is not our intention to limit the invention to the precise details of construction heretofore described and shown in the accompanying drawings, it being apparent that such may be varied without departing from the spirit and scope of the invention.

Having described the invention, what we claim as new and desire to have protected by Letters Patent is:—

1. In the box-making machine, the combination with a neck feeding, scoring and cutting mechanism, an axially reciprocating and rotary neck-former, means for intermittently rotating said former, means for reciprocating said former, means to engage neck strip on former to properly press and bend said strip thereto while being wrapped thereon, means for holding forward end of neck strip on former, means for holding rear end of neck strip on former, means for wrapping a surface finishing strip on wound neck strip, and means to bend and tuck in the protruding marginal portions thereof.

2. In a box-making machine, the combination with a neck feeding, scoring and cutting mechanism, an axially reciprocating and rotary shaft provided with a neck former, means for intermittently rotating said shaft, means for reciprocating said shaft, means revolving in relation with neck former to engage neck strip therewith and to properly press and bend it on former while being wrapped thereon, means for holding forward end of neck strip on former, means for holding rear end of neck strip on former, means for wrapping a surface finishing strip on wound neck, and means to bend and tuck in the protruding marginal portions thereof.

3. In a box-making machine, the combination with a neck feeding, scoring and cutting mechanism, an axially reciprocating and rotary shaft provided with a neck former, means for intermittently rotating said shaft, means for reciprocating said shaft, means mounted on said shaft and adjacent to said former for clamping forward end of neck strip thereto before being wound, means for clamping rear end of said strip thereto after being wound and movable with last mentioned means, means revolving in relation with said former to engage neck strip therewith and to properly press and bend it while being wrapped thereon, means for wrapping a surface finishing strip on wound neck, and means to bend and tuck in the protruding marginal portions thereof.

4. In a box-making machine, the combination with an axially reciprocating and rotary shaft provided with a neck former, means for rotating said shaft, means for reciprocating said shaft, means revolving in relation with said former engaging neck strip therewith while being wrapped thereon, means mounted on said shaft and adjacent to said former for clamping forward end of neck strip thereto, means for clamping rear end of neck strip thereto after being wound and movable with last mentioned means, a rotatable carrier for last two mentioned means, means for wrapping a surface finishing strip on wound neck, and means to bend and tuck in the protruding marginal portions thereof.

5. In a box-making machine, the combination with an axially reciprocating and rotary shaft provided with a neck former, means revolving in relation with said former engaging neck strip on former while being wrapped thereon, a clutch finger for clamping forward end of said strip thereto, a spring engaging said finger normally tending it against the neck former, a rotatable carrier for said finger, means on said carrier for clamping rear end of said strip, means for wrapping a surface finishing strip on wound neck, and means to bend and tuck in the protruding marginal portions thereof.

6. In a box-making machine, the combination with an axially reciprocating and rotary shaft provided with a neck former, means engaging neck strip on former while being wrapped thereon, means for clamping forward end of said strip thereto, a clutch finger for clamping rear end of said strip thereto, a spring engaging said finger normally tending it against neck former, a rotatable carrier for last mentioned means and clutch finger, means for wrapping a surface finishing strip on wound neck strip, and means to bend and tuck in the protruding marginal portions thereof.

7. In a box-making machine, the combination with an axially reciprocating and rotary shaft provided with a neck former, means for engaging neck strip on former while being wrapped thereon, a clutch finger for clamping forward end of said strip thereto, a spring engaging said finger, a clutch finger for clamping rear end of said strip on former after being wound, a spring engaging last mentioned finger, a rotatable carrier for both clutch fingers, means for wrapping a surface finishing strip on wound neck strip, and means to bend and tuck in the protruding marginal portions thereof.

8. In a box-making machine, the combination with an axially reciprocating and rotary shaft provided with a neck former, means engaging neck strip on former while being wrapped thereon, means for clamping forward end of neck strip thereto, means for clamping rear end of neck strip thereto, a rotatable ring support for last two mentioned means, an annular groove for said ring support, means for wrapping a surface finishing strip on wound neck strip, and means to bend and tuck in the protruding marginal portions thereof.

9. In a box-making machine, the combination with an axially reciprocating and rotary shaft provided with a neck former, means engaging neck strip on former while being wrapped thereon, a link adapted to slide on said shaft and having an annular groove, a ring support rotatable on said groove, means tending to keep said ring in its normal position, means for clamping forward end of neck strip on said former, means for clamping rear end of neck strip on former, both means mounted on said ring support, means for wrapping a surface finishing strip on wound neck strip, and means to bend and tuck in the protruding marginal portions thereof.

10. In a box-making machine, the combination with an axially reciprocating and rotary shaft provided with a neck former, means engaging neck strip on former while being wrapped thereon, a reciprocating link adapted to slide on said shaft and having an annular groove, means reciprocating said link, a ring support rotatable on said groove, means tending to maintain said ring in its normal position, means for clamping forward end of neck strip on said former, means for clamping rear end of neck strip on former, both means mounted on said ring support, means for wrapping a surface finishing strip on wound neck strip, and means to bend and tuck in the protruding marginal portions thereof.

11. In a box-making machine, the combination with an axially reciprocating and rotary shaft provided with a neck former, means engaging neck strip on former while being wrapped thereon, an axially reciprocating shaft, a link working with last mentioned shaft and adapted to slide on first mentioned shaft, an annular groove on said link, a ring support rotatable on said groove, means tending to maintain said ring in its normal position, means for clamping forward end of neck strip on said former, means for clamping rear end of neck strip on said former, both means mounted on said ring support, means for wrapping a surface finishing strip on wound neck strip, and means to bend and tuck in the protruding marginal portions thereof.

12. In a box-making machine, the combination with an axially reciprocating and rotary shaft provided with a neck former, means engaging neck strip on former while being wrapped thereon, an axially reciprocating shaft, a link working with last mentioned shaft and adapted to slide on first mentioned shaft, an annular groove on said link, a ring support rotatable on said groove, a resiliently projecting pin in said ring, tending against said groove to keep the ring support in its normal position, a clutch finger mounted on said ring for clamping the forward end of neck strip on former, a spring engaging said finger, a clutch finger mounted on said ring support and shorter than the first mentioned finger, for clamping rear end of neck strip, all substantially as described, means for wrapping a surface finishing strip on wound neck strip, and means to bend and tuck in the protruding marginal portions thereof.

13. In a box-making machine, the combination with an axially reciprocating and rotary shaft provided with a neck former, means for feeding a neck strip thereto, lobes suitably mounted, the profile of which conforms with the shape of former, to work in relation with said former for engaging and bending neck strip on former while being wound thereon, and to move immediately out of the way therefrom, means for clamping forward end of neck strip on former before being wound, means for clamping rear end of neck strip after being wound, means for wrapping a surface finishing strip on wound neck, and means to bend and tuck in the protruding marginal portions thereof.

14. In a box-making machine, the combination with an axially reciprocating and rotary shaft provided with a neck former, means for feeding a neck strip thereto, lobes circumferentially mounted to revolve in relation with said former and to engage and bend neck strip on former while being wound thereon, and to move immediately out of the way therefrom, means for clamping forward end of neck on former before being wound, means for clamping rear end of neck strip on former after being wound, means for wrapping a surface finishing strip on wound neck, and means to bend and tuck in the protruding marginal portions thereof.

15. In a box-making machine, the combination with an axially reciprocating and rotary shaft provided with a neck former, means for feeding a neck strip thereto, a sector of a wheel provided on its periphery with lobes to revolve in relation with said former for engaging and bending neck strip on former while being wound thereon, and to immediately move out of the way therefrom, means for clamping forward end of neck strip on former before being wound, means for clamping rear end of neck strip after being wound, means for wrapping a surface finishing strip on wound neck, and means to bend and tuck in the protruding marginal portions thereof.

16. In a box-making machine, the combination with an axially reciprocating and rotary shaft provided with a neck former, means for feeding a neck strip thereto, a sector of a wheel mounted on a rotary shaft and provided on its periphery with lobes to revolve in relation with said former for engaging and bending neck strip on former while being wound thereon, and to immediately swing out of the way therefrom, substantially as described, means for clamping forward end of neck strip on former before being wound, means for clamping rear end of neck strip on former after being wound, means to wrap a surface finishing strip on wound neck, and means to bend and tuck in the protruding marginal portions thereof.

17. In a box-making machine, the combination with an axially reciprocating and rotary shaft provided with a neck former, means for feeding a neck strip thereto, circumferentially mounted lobes to revolve in relation with said former for engaging and bending neck strip on former while being wound thereon, means for radially adjusting said lobes to precisely suit the thickness of neck strip, means for clamping forward end of neck strip on former before being wound, means for clamping rear end of neck strip on former after being wound, means for wrapping a surface finishing strip on wound neck, and means to bend and tuck in the protruding marginal portions thereof.

18. In a box-making machine, the combination with an axially reciprocating and rotary shaft provided with a neck former, means for feeding a neck strip thereto, a sector of a wheel comprising two sections, means for radially adjusting said sections, means for clamping said sections together, all substantially as described, means for clamping forward end of neck strip on former before being wound, means for clamping rear end of neck strip on former after being wound, means for wrapping a surface finishing strip on wound neck, and means to bend and tuck in the protruding marginal portions thereof.

19. In a neck-making mechanism, the combination with an axially reciprocating and rotary shaft provided with a neck former, means for feeding a neck strip thereto, means for winding said strip on said former, means for holding forward end of said strip thereon, means for holding rear end of said strip thereon, means to axially advance said former, means for feeding a surface finishing strip thereto, means for severing said finishing strip, lobes suitably mounted, the profile of which conforms with shape of wound neck, to work in relation with neck for engaging and pasting said finishing strip on wound neck and to immediately move out of the way therefrom, and means to bend and tuck in the protruding marginal portions thereof.

20. In a neck-making mechanism, the combination with an axially reciprocating and rotary shaft provided with a neck former, means for feeding a neck strip thereto, means for winding said strip on neck former, means for holding forward end of neck strip thereon, means for holding rear end of neck strip thereon, means to axially advance said former, means for feeding a surface finishing strip thereto, lobes circumferentially mounted to revolve in relation with said wound neck for engaging and pasting said finishing strip thereon while being wound, and to move immediately out of the way therefrom, and means to bend and tuck in the protruding marginal portions thereof.

21. In a neck-making mechanism, the combination with an axially reciprocating and rotary shaft provided with a neck former, means for feeding a neck strip thereto, means for winding said strip on neck former, means for holding forward end of neck strip thereon, means for holding rear end of neck strip thereon, means to axially advance said former, means for feeding a surface finishing strip thereto, a sector of a wheel provided on its periphery with lobes to revolve in relation with wound neck for engaging and pasting said finishing strip thereon while being wound, and to immediately move out of the way therefrom, and means to bend and tuck in the protruding marginal portions thereof.

22. In a neck-making mechanism, the combination with an axially reciprocating and rotary shaft provided with a neck former, means for feeding a neck strip thereto, means for winding said strip on neck former, means for holding forward end of neck strip thereon, means for holding rear end of neck strip thereon, means to axially advance said former, means for feeding a surface finishing strip thereto, a sector of a wheel mounted on a continually revolving shaft, and provided on its periphery with lobes to revolve in relation with wound neck for engaging and pasting said finishing strip thereon while being wound, and to immediately swing out of the way therefrom, all substantially as described, and means to bend and tuck in the protruding marginal portions thereof.

23. In a neck-making mechanism, the combination with an axially reciprocating and rotary shaft provided with a neck former, means for feeding a neck strip thereto, means for winding said strip on former, means for holding forward end of neck strip thereon, means for holding rear end of said strip thereon, means to axially advance said former, means for feeding a surface finishing strip thereto, circumferentially mounted lobes to revolve in relation with wound neck for engaging and pasting said finishing strip thereon while being wound, and to immediately move out of the way therefrom, means for radially adjusting said lobes to precisely suit the thickness of the material, and means to bend and tuck in the protruding marginal portions of wound surface finishing strip.

24. In a neck-making mechanism, the combination with an axially reciprocating and rotary shaft provided with a neck former, means for feeding a neck strip thereto, means for winding said strip on former, means for holding forward end of said strip thereon, means for holding rear end of said strip thereon, means to axially advance said former, a lobed sector of a wheel comprising two sections, means for radially adjusting said sections, substantially as described, and means to bend and tuck in the protruding marginal portions of wound surface finishing strip.

25. In a neck-making mechanism, the combination with an axially reciprocating and rotary shaft provided with a neck former, means for feeding a neck strip thereto, means for wrapping neck strip thereon, means for holding wound neck on former, means for feeding a surface finishing strip thereto, means for severing said strip, means for wrapping said finishing strip thereon, and pivotal arms disposed around neck former to bend and tuck in the protruding marginal portions of the wound surface finishing strip.

26. In a neck-making mechanism, the combination with an axially reciprocating and rotary shaft provided with a neck former, means for feeding a neck strip thereto, means for wrapping neck strip thereon, means for holding wound neck on former, means for feeding a surface finishing strip thereto, means for severing said strip, means for wrapping said finishing strip thereon, centrally pivoted arms disposed about neck former to bend and tuck in the protruding marginal portions of the wound surface finishing strip, yielding means normally forcing said arms to an open position, and means for intermittently opening and closing said arms.

27. In a neck-making mechanism, the combination with an axially reciprocating and rotary shaft provided with a neck former, means for feeding a neck strip thereto, means for wrapping neck strip thereon, means for holding wound neck on former, means for feeding a surface finishing strip thereto, means for severing said strip, means for wrapping said surface finishing strip on wound neck, centrally pivoted arms disposed about neck former to bend and tuck in the protruding marginal portions of wound finishing strip, springs normally forcing said arms to an open position, cam members engaging said arms against the tension of said springs and adapted to intermittently close and open said arms.

28. In a neck-making mechanism, the combination with an axially reciprocating and rotary shaft provided with a neck former, means for feeding a neck strip thereto, means for wrapping neck strip thereon, means for holding wound neck on former, means for feeding a surface finishing strip thereto, means for severing said strip, means for wrapping said surface finishing strip on wound neck, centrally pivoted arms disposed about neck former to bend and tuck in the protruding marginal portions of wound surface finishing strip, springs normally forcing said arms to an open position, axially reciprocating cam members engaging said arms against the tension of said springs for intermittently closing and opening said arms.

29. In a neck-making mechanism, the combination with an axially reciprocating and rotary shaft provided with a neck former, means for feeding a neck strip thereto, means for wrapping neck strip thereon, means for holding wound neck on former, means for feeding a surface finishing strip thereto, means for severing said strip, means for wrapping said surface finishing strip on wound neck, centrally pivoted arms disposed about neck former to bend and tuck in the protruding marginal portions of the wound surface finishing strip, springs normally forcing said arms to an open position, cam rollers on said arms, axially reciprocating cam members engaging said cam rollers against the tension of said springs for intermittently closing and opening said arms.

30. In a neck-making mechanism, the combination with an axially reciprocating and rotary shaft provided with a neck former, means for feeding a neck strip thereto, means for wrapping neck strip thereon, means for holding wound neck on former, means for feeding a surface finishing strip thereto, means for severing said strip, means for wrapping said surface finishing strip on wound neck, centrally pivoted arms disposed about neck former to bend and tuck in the protruding marginal portions of the wound surface finishing strip, springs normally tending said arms to an open position, an axially reciprocating sleeve mounted on first mentioned shaft and provided with cam lugs, said lugs engaging said arms against the tension of said springs for intermittently closing and opening said arms.

31. In a neck-making mechanism, the combination with an axially reciprocating and rotary shaft provided with a neck former, means for feeding a neck strip thereto, means for wrapping neck strip thereon, means for holding wound neck strip on former, means for axially advancing neck former, means for feeding a surface finishing strip thereto, means for wrapping said surface finishing strip on wound neck, axially reciprocating pivoted arms disposed about neck former and reciprocated by first mentioned shaft to bend and tuck in the protruding marginal portions of the surface finishing strip, springs normally forcing said arms to an open position, and means for intermittently closing and opening said arms.

32. In a neck-making mechanism, the combination with an axially reciprocating and rotary shaft provided with a neck former, means for feeding a neck strip thereto, means for wrapping neck strip thereon, means for holding wound neck on former, means for axially advancing neck former, a collar loosely mounted on first mentioned shaft and reciprocated thereby, means for supporting said collar and maintain it from revolving, arms disposed about neck former and pivoted on said collar to bend and tuck in the protruding marginal portions of the wound surface finishing strip, springs normally forcing said arms to an open position, and means for intermittently closing and opening said arms.

33. In a neck-making mechanism, the combination with an axially reciprocating and rotary shaft provided with a neck former, means for feeding a neck strip thereto, means for wrapping neck strip thereon, means for holding wound neck on former, means for axially advancing neck former, a collar loosely mounted on first mentioned shaft and reciprocated thereby, sleeves laterally extending from said collar together with fixed rods upon which they slide, for supporting said collar and maintain it from revolving, all substantially as described, arms disposed about neck former and pivoted on said collar to bend and tuck in the protruding marginal portions of the wound surface finishing strip, springs normally forcing said arms to an open position, and means for intermittently closing and opening said arms.

34. In a neck-making mechanism, the combination with an axially reciprocating and rotary shaft provided with a neck former, means for feeding a neck strip thereto, means for wrapping a neck strip thereon, means for holding wound neck on former, means for feeding a surface finishing strip thereto, means for severing said strip, means for wrapping said surface finishing strip on wound neck, centrally pivoted arms disposed about neck former to bend and tuck in the protruding marginal portions of the wound surface finishing strip, springs normally forcing said arms to an open position cam rollers on said arms, an axially reciprocating sleeve mounted on first mentioned shaft and provided with cam lugs, each lug engaging a different cam roller against the tension of said springs for intermittently closing and opening said arms, and means keeping said sleeve from revolving.

35. In a neck-making mechanism, in combination with a neck former, means for wrapping a neck strip thereon, means for wrapping a surface finishing strip on wound neck, pivoted arms disposed about neck former for bending and tucking in the protruding marginal portions of the wound surface finishing strip, means forcing said arms to an open position, and means for intermittently closing and opening said arms.

36. The combination of an axially reciprocating and rotary shaft provided with a neck former, means for scoring, cutting and feeding a neck strip thereto, means revolving in relation with said former engaging said strip on former while being wrapped thereon and immediately move out of the way therefrom, means for holding the forward portion of said strip on former before being wound, means for holding rear portion of neck strip on former after being wound and movable with last mentioned means, means for applying adhesive substance to one side of a surface finishing strip, means for feeding said strip to wound neck, a cutting device disposed between last mentioned means and wound neck to cut said finishing strip, means revolving in relation with neck former engaging said surface finishing strip with wound neck and paste it thereabout, and to move immediately out of the way therefrom, means pivotally disposed about said former to bend and tuck in the protruding marginal portions of wound surface finishing strip, and means actuating last mentioned means.

37. In a box-making machine, the combination of an axially reciprocating and rotary shaft provided with a plunger head, an axially reciprocating and rotary shaft provided with a clamping head and coaxially in line with last mentioned shaft, means for coöperatively actuating said shafts, means for feeding previously scored body-blanks between said heads, an aperture disposed for said heads to pass the body-blank therethrough bending it at the scorings, means for applying adhesive substance to one side of a surface finishing strip, means for feeding said strip to bent body-blank, a cutting device to cut said strip at the required length, means revolving in relation with said plunger head to engage said strip for winding and pasting it about the sides of bent body-blank, and to move immediately away therefrom, means pivotally disposed around said body, the applying edges of which, in a circular closing motion, are adapted to bend the protruding marginal portions of the surface finishing strip, means actuating last mentioned means, and means for tucking in the bent marginal portions of the surface finishing strip.

38. In a box-making machine, the combination with a rotary plunger, means for feeding body-blanks thereto, a rotary clamping head for clamping body-blank to plunger and coöperating with same, means for bending the sides of body-blank, means for feeding a surface finishing strip to bent sides of body-blank, means severing said strip, lobes suitably mounted, the profile of which conforms with the shape of a finished body, to work in relation with bent body-blank for engaging and pasting said finishing strip on bent sides while being wound thereon, and move immediately out of the way therefrom, means to bend the protruding marginal portions of the surface finishing strip, and means for tucking in the bent marginal portions thereof.

39. In a box-making machine, the combination with a rotary plunger, means for feeding body-blanks thereto, a rotary clamping head for clamping body-blank to plunger and coöperating with same, means for bending the sides of body-blank, means for feeding a surface finishing strip to bent sides of body-blank, means severing said strip, lobes circumferentially mounted to revolve in relation with bent sides of blank, for engaging and pasting said finishing strip thereto while being wound thereon, and move immediately out of the way therefrom, means to bend the protruding marginal portions of the surface finishing strip, and means for tucking in the bent marginal portions thereof.

40. In a box-making machine, the combination with a rotary plunger, means for feeding body-blanks thereto, a rotary clamping head for clamping body-blank to plunger and coöperating with same, means for bending sides of body-blank, means for feeding a surface finishing strip to bent sides of body-blank, means severing said strip, a sector of a wheel provided on its periphery with lobes to revolve in relation with bent sides of blank for engaging and pasting said finishing strip thereto while being wound thereon, and said lobes to swing immediately out of the way therefrom, means to bend the protruding marginal portions of the surface finishing strip, and means for tucking in the said bent portions.

41. In a box-making machine, the combination with a rotary plunger, means for feeding body blanks thereto, a rotary clamping head for clamping a body-blank to plunger and coöperating with same, means for bending the sides of body-blank, means for feeding a surface finishing strip to bent sides of body-blank, means severing said strip, a sector of a wheel mounted on a continually revolving shaft and provided on its periphery with lobes to revolve in relation with bent sides of body-blank for engaging and pasting said finishing strip thereto while being wound thereon, and said lobes to swing immediately out of the way therefrom, means to bend the protruding marginal portions of surface finishing strip, and means for tucking in the said bent portions.

42. In a box-making machine, the combination with a rotary plunger, means for feeding body-blanks thereto, a rotary clamping head for clamping a body-blank to plunger and coöperating with same, means for bending the sides of body-blank, means for feeding a surface finishing strip to bent sides of body-blank, means severing said strip, circumferentially mounted lobes to revolve in relation with bent sides of blank for engaging and pasting said surface finishing strip thereto while being wound thereon, means for radially adjusting said lobes to precisely suit the thickness of the material, means to bend the protruding marginal portions of the surface finishing strip, and means for tucking in the said bent portions.

43. In a box-making machine, the combination with a rotary plunger, means for feeding body blanks thereto, a rotary clamping head for clamping a body-blank to plunger and coöperating with same, means for bending the sides of body-blank, means for feeding a surface finishing strip to bent sides of body-blank, means severing said strip, a lobed sector of a wheel comprising two sections, means for radially adjusting said sections, substantially as described, means for bending the protruding marginal portions of surface finishing strip, and means for tucking in the said bent portions.

44. In a box-making machine, the combination with an axially reciprocating and rotary shaft provided with a plunger head, means for feeding body blanks thereto, an axially reciprocating and rotary shaft provided with a clamping head for clamping a body-blank with plunger head and coöperating with same, an aperture disposed to bend the sides of said blank when passed therethrough, means for feeding a surface finishing strip to bent sides of blank, means for severing said strip, a sector of a wheel provided on its periphery with lobes to revolve in relation with bent sides of blank for engaging and pasting said finishing strip thereto while being wound thereon, and said lobes to swing immediately out of the way therefrom, means to bend the protruding marginal portions of the surface finishing strip, and means for tucking in the said bent portions.

45. In a box-making machine, the combination with a rotary plunger, means for feeding body-blanks thereto, a rotary clamping head for clamping a body-blank to plunger and coöperating with same, means for bending sides of body-blank, means for feeding a surface finishing strip to bent sides of blank, means severing said strip, means for engaging and pasting said strip on bent sides of blank while being wound thereon, pivoted arms disposed about clamping head, the applying edges of which, in a circular closing motion, are adapted to bend the protruding marginal portions of the surface finishing strip, and means for tucking in the bent marginal portions on one side thereof.

46. In a box-making machine, the combination with a rotary plunger, means for feeding body blanks thereto, a rotary clamping head for clamping a body-blank to plunger and coöperating with same, means for bending the sides of body-blank, means for feeding a surface finishing strip to bent sides of blank, means severing said strip, means for engaging and pasting said strip on bent sides of blank while being wound thereon, centrally pivoted arms disposed about clamping head, the applying edges of which, in a circular closing motion, are adapted to bend the protruding marginal portions thereof, yielding means normally forcing said arms to an open position, means for intermittently opening and closing said arms, and means for tucking in the bent marginal portions on one side thereof.

47. In a box-making machine, the combination with a rotary plunger, means for feeding body blanks thereto, a rotary clamping head for clamping a body-blank to plunger and coöperating with same, means for bending sides of body-blank, means for feeding a surface finishing strip to bent sides of blank, means severing said strip, means for engaging and pasting said strip on bent sides of blank while being wound thereon, centrally pivoted arms disposed about said clamping head, the applying edges of which, in a circular closing motion, are adapted to bend the protruding marginal portions of surface finishing strip, springs normally forcing said arms to an open position, cam members engaging said arms against the tension of said springs and adapted to intermittently close and open said arms, and means for tucking in the bent marginal portions on one side thereof.

48. In a box-making machine, the combination with a rotary plunger, means for feeding body blanks thereto, a rotary clamping head for clamping a body-blank to plunger and coöperating with same, means for bending sides of body-blank means for feeding a surface finishing strip to bent sides of blank, means severing said strip, means for engaging and pasting said strip on bent sides of blank while being wound thereon, centrally pivoted arms disposed about clamping head, the applying edges of which, in a circular closing motion, are adapted to bend the protruding marginal portions of the surface finishing strip, springs normally forcing said arms to an open position, axially reciprocating cam members engaging said arms against the tension of said springs for intermittently closing and opening said arms, and means for tucking in the bent marginal portions on one side thereof.

49. In a box-making machine, the combination with a rotary plunger, means for feeding body blanks thereto, a rotary clamping head for clamping a body blank to plunger and coöperating with same, means for bending sides of body-blank, means for feeding a surface finishing strip to bent sides of blank, means for severing said strip, means for engaging and pasting said strip on bent sides of blank while being wound thereon, centrally pivoted arms disposed about said clamping head, the applying edges of which, in a circular closing motion, are adapted to bend the protruding marginal portions of the surface finishing strip, springs normally forcing said arms to an open position, cam rollers on said arms, axially reciprocating cam members engaging said cam rollers against the tension of said springs for intermittently closing and opening said arms, and means for tucking in the bent marginal portions on one side thereof.

50. In a box-making machine, the combination with an axially reciprocating and rotary shaft provided with a plunger head, means for feeding body blanks thereto, an axially reciprocating and rotary shaft provided with a clamping head for clamping a body-blank with plunger head and coöperating with same, an aperture disposed to bend the sides of said blank when passed therethrough, means for feeding a surface finishing strip to bent sides of blank, means for severing said strip, means for engaging and pasting said surface finishing strip to bent sides while being wound thereon, an axially reciprocating hollow shaft mounted coaxially on said clamping head shaft, centrally pivoted levers mounted on said hollow shaft for bending the protruding marginal portions of the surface finishing strip, springs forcing said levers to an open position, an axially reciprocating sleeve provided with cam members engaging said arms against the tension of said springs for intermittently closing and opening arms, and means for tucking in the bent marginal portions on one side of surface finishing strip.

51. In a box-making machine, the combination with a rotary plunger, means for feeding body blanks thereto, a rotary clamping head for clamping a body-blank to plunger and coöperating with same, means for bending sides of body-blank, means for feeding a surface finishing strip to bent sides of blank, means severing said strip, means for engaging and pasting said strip on bent sides of blank while being wound thereon, centrally pivoted arms disposed about the said clamping head with channels formed thereon for bending the protruding marginal portions of the surface finishing strip, springs normally forcing said arms to an open position, cam members engaging said arms against the tension of said springs for intermittently closing and opening them, and means for tucking in the bent marginal portions on one side of the surface finishing strip.

52. In a box-making machine, the combination with a rotary plunger, means for feeding body blanks thereto, a rotary clamping head for clamping a body-blank to plunger and coöperating with same, means for bending sides of body-blank, means for feeding a surface finishing strip to bent sides of blank, means severing said strip, means for engaging and pasting said strip on bent sides of blank while being wound thereon, centrally pivoted arms disposed about said clamping head with channels formed thereon for bending the protruding marginal portions of surface finishing strip, yielding plates constituting one side of said channels, spring members forcing said plates to bend the protruding marginal portions of finishing strip, springs normally forcing said arms to an open position, cam members engaging said arms against the tension of said springs for intermittently closing and opening them, and means for tucking in the bent marginal portions on one side of the surface finishing strip.

53. In a box-making machine, the combination with an axially reciprocating and rotary shaft provided with a plunger head, means for feeding body blanks thereto, an axially reciprocating and rotary shaft provided with a clamping head for clamping the body-blank with plunger head and cooperating with same, means for bending the sides of said blank, means for feeding a surface finishing strip to bent sides of blank, means for engaging and pasting said surface finishing strip to said bent sides while being wound thereon, means for bending the protruding marginal portions thereof, an axially reciprocating and rotary hollow shaft mounted coaxially on said plunger head shaft and provided with a neck former, means feeding a neck strip thereto, means engaging neck strip thereto while being wound thereon, means for holding wound neck on former, means for feeding a surface finishing strip thereto, means severing said strip, means for wrapping said surface finishing strip on wound neck and means for inserting wound neck in the body.

54. In a box-making machine, the combination with an axially reciprocating and rotary shaft provided with a plunger head, means for feeding body blanks thereto, means for intermittently reciprocating said shaft, means for intermittently rotating said shaft, an axially reciprocating and rotary shaft provided with a clamping head for clamping body-blanks to plunger head, means for intermittently reciprocating said clamping head shaft, means for intermittently rotating same, an axially reciprocating and rotary hollow shaft mounted on plunger head shaft and provided with a neck former, means for intermittently reciprocating said hollow shaft, means for intermittently rotating same, means for bending sides of body-blank, means for feeding a surface finishing strip to bent sides, means for wrapping the surface finishing strip thereon, pivotal means for bending the protruding marginal portions of said strip, means for feeding a neck strip to neck former, means for wrapping neck strip thereon, means for holding wound neck on former, means for feeding a surface finishing strip thereto, means for wrapping said strip thereon, pivotal means on said hollow shaft for bending and tucking in the protruding marginal portions of finishing strip and for forcing the neck in body when said neck former carries it therein.

55. In a box-making machine, the combination of an axially reciprocating and rotary shaft provided with a neck former, means for feeding a neck strip thereto, means for wrapping neck strip thereon, means for holding wound neck thereon, means for feeding a surface finishing strip to wound neck, means for wrapping surface finishing strip thereon, means for applying adhesive substance on the sides of wound neck while winding the surface finishing strip thereon, so that said neck may firmly adhere to a box body when inserted therein, and means for bending and tucking in the protruding marginal portions of surface finishing strip.

56. In a box-making machine, the combination of an axially reciprocating and rotary shaft provided with a neck former, means for feeding a neck strip thereto, means for wrapping neck strip thereon, means for holding wound neck thereon, means for feeding a surface finishing strip to wound neck, means for wrapping surface finishing strip thereon, a receptacle containing adhesive substance, provided with a rotating distributing roller and adjacent to neck former, means for transferring the adhesive substance from said distributing roller to sides of wound neck, and means for bending and tucking in the protruding marginal portions of surface finishing strip.

57. In a box-making machine, the combination of an axially reciprocating and rotary shaft provided with a neck former, means for feeding a neck strip thereto, means for wrapping neck strip thereon, means for holding wound neck thereon, means for feeding a surface finishing strip to wound neck, means for wrapping surface finishing strip thereon, a receptacle containing adhesive substance, provided with a rotating distributing roller and adjacent to neck former, an oscillating roller intermittently traveling from said distributing roller to the sides of wound neck for the purpose of applying adhesive substance thereon, means oscillating said roller, and means for bending and tucking in the protruding marginal portions of surface finishing strip.

58. In a box-making machine, the combination of an axially reciprocating and rotary shaft provided with a neck former, means for feeding a neck strip thereto, means for wrapping neck strip thereon, means for holding wound neck thereon, means for feeding a surface finishing strip to wound neck, means for wrapping surface finishing strip thereon, a receptacle containing adhesive substance, provided with a rotating distributing roller and adjacent to neck former, an oscillating lever, a cam working said lever, a spring normally forcing said lever with said cam, a roller on said lever and intermittently oscillated thereby from said distributing roller to sides of neck for the purpose of applying thereon the adhesive substance gathered from said distributing roller, and means for bending and tucking in the protruding marginal portions of surface finishing strip.

59. In a box-making machine, the combination with the wrapping mechanism for the surface finishing strip, means for applying an adhesive substance to the surface finishing strip, a reciprocating clutch mechanism comprising a channeled block, means reciprocating said block, a pivoted finger, a toothed wheel on said finger, a spring member engaging said wheel and forcing it to clutch the surface finishing strip for feeding it in relation to the wrapping mechanism.

60. In a box-making machine, the combination with an axially reciprocating and rotary shaft provided with a plunger head, means for feeding body blanks thereto, an axially reciprocating and rotary shaft provided with a clamping head for clamping a body blank to said plunger head and coöperating with same, means for bending the sides of body-blank, an axially reciprocating and rotary hollow shaft on said plunger shaft and provided with a neck former, means for feeding a neck strip thereto, means wrapping said strip thereon, means holding wound neck on former, means for applying adhesive substance to a surface finishing strip for the bent sides of body-blank, means applying adhesive substance to surface finishing strip for wound neck, a reciprocating feeding device for clutching and feeding at one time both surface finishing strips in relation to their respective wrapping mechanisms, means for wrapping the surface finishing strips to the bent sides of body-blank and neck, respectively, and means for bending and tucking in the protruding marginal portions thereof.

61. In a box-making machine, the combination of an axially reciprocating and rotary shaft provided with a plunger head, means for feeding body blanks thereto, an axially reciprocating and rotary shaft provided with a clamping head for clamping a body-blank to said plunger head and coöperating with same, means for bending the sides of body-blank, an axially reciprocating and rotary hollow shaft on said plunger shaft and provided with a neck former, means for feeding a neck strip thereto, means wrapping neck strip thereon, means holding wound neck on former, means for applying adhesive substance to surface finishing strip for the bent sides of body-blank, means applying adhesive substance to surface finishing strip for wound neck, a reciprocating feeding mechanism comprising a channeled block, means reciprocating said block, pivoted fingers, toothed wheels on said fingers, spring members engaging said wheels and forcing them to clutch and feed at one time both surface finishing strips in relation to their respective wrapping mechanisms, substantially as described, means for wrapping the surface finishing strips to the bent sides of body-blank and neck, respectively, and means for bending and tucking in the protruding marginal portions thereof.

62. In a box-making machine, the combination with the wrapping mechanism for the surface finishing strip, means applying adhesive substance to said strip, means for feeding said strip, a cutting device comprising two pivoted members to cut the material in a shear-like action transversely thereof, two centrally pivoted arms connected to operate said members, a cam directly operating said arms for separating said members, and a spring tending normally to force the members to cut the material.

63. In a box-making machine, the combination with an axially reciprocating and rotary shaft provided with a plunger head, means for feeding body blanks thereto, an axially reciprocating and rotary shaft provided with a clamping head for clamping a body-blank to said plunger and coöperating with same, means for bending sides of body-blank, an axially reciprocating and rotary hollow shaft on said plunger shaft and provided with a neck former, means for feeding a neck strip thereto, means wrapping said strip thereon, means holding wound neck on former, means applying adhesive substance to a surface finishing strip for bent sides of blank, means applying adhesive substance to surface finishing strip for neck, a feeding device for clutching and feeding at one time both surface finishing strips, a cutting device placed transversely to the surface finishing strips and with a shear-like action cut both strips at one time, means for wrapping the surface finishing strips to the bent sides of body-blank and neck, respectively, and means for bending and tucking in the protruding marginal portions thereof.

64. In a box-making machine, the combination with an axially reciprocating and rotary shaft provided with a plunger head, means for feeding body blanks thereto, an axially reciprocating and rotary shaft provided with a clamping head for clamping a body-blank to said plunger and coöperating with same, means for bending sides of body-blank, an axially reciprocating and rotary hollow shaft on said plunger shaft and provided with a neck former, means for feeding a neck strip thereto, means wrapping said strip thereon, means holding wound neck on former, means applying adhesive substance to a surface finishing strip for bent sides of blank, means applying adhesive substance to surface finishing strip for neck, a feeding device for clutching and feeding at one time both surface finishing strips, a cutting device comprising two centrally pivoted members adapted to cut at one time both surface finishing strips with a shear-like action and transversely thereof, including, two centrally pivoted arms connected to operate said members, a cam operating directly said arm for separating said members, a spring tending normally to force the members to cut the material, substantially as described, means for wrapping the surface finishing strips to the bent sides of body-blank and neck, respectively, and means for bending and tucking in the protruding marginal portions thereof.

65. In a box-making machine, in combination with a rotary shaft provided with a former, means for feeding wrapping material thereto, a sector of a wheel having lobes on its periphery the profile of which conforms with the shape of former so that when revolving with in relation with said former there will be a gearing engagement between the two for wrapping said material on former, means for radially adjusting said sector to suit the thickness of the material, and means for positively revolving said sector in relation with said former..

66. In a box-making machine, the combination of an axially reciprocating and rotary shaft provided with a plunger head, means for feeding body blanks thereto, an axially reciprocating and rotary shaft provided with a clamping head for clamping body blank with said plunger and coöperating with same, an axially reciprocating and rotary hollow shaft coaxially mounted on plunger shaft, a neck former on said hollow shaft, means for bending the sides of body-blank, means for supplying a surface finishing strip thereto, means for engaging and pasting said strip thereon while being wound, means for supplying a neck strip to neck former, means engaging and bending said strip on former while being wound thereon, means for axially advancing said neck, means for feeding a surface finishing strip thereto, a cutting device for said surface finishing strips, means for engaging and pasting the surface finishing strip on wound neck while being wound thereon, pivotal means disposed around neck former for bending and tucking in the protruding marginal portions of the neck finishing strip, pivotal means disposed around the bent body-blank for bending the protruding marginal portions of the surface finishing strip thereof, means inserting the finished neck in body, and means disposing of the finished box.

67. In a box-making machine, the combination of an axially reciprocating and rotary shaft provided with a plunger head, said head having its corners and portions of its sides cut out, means for feeding body-blanks thereto, an axially reciprocating and rotary shaft provided with a clamping head for clamping a body-blank with said plunger head and coöperating with same, means for bending the sides of body-blank, means for winding a surface finishing strip thereon, means for bending the protruding marginal portions thereof, an axially reciprocating and rotary hollow shaft coaxially mounted on plunger shaft, a neck former on said hollow shaft and having a hollow recess on its front face to suit the shape of said plunger head, so that when both come together the plunger head will fit in said recess thereby making it possible for neck former to enter the body, over the plunger head and deliver the neck therein, all substantially as described, means for winding a neck strip on said neck former, means for winding a surface finishing strip thereon, means for bending the protruding marginal portions thereof, and means inserting neck in body.

68. In a box-making machine, the combination of an axially reciprocating and rotary shaft provided with a plunger head $s$, means for feeding body-blanks thereto, an axially reciprocating and rotary shaft provided with a clamping head for clamping a body-blank with said plunger head and coöperating with same, means for bending the sides of body-blank, means for winding a surface finishing strip thereon, means for bending the protruding marginal portions thereof, an axially reciprocating and rotary hollow shaft coaxially mounted on plunger shaft and provided with a neck former $w$, means for winding a neck strip on said neck former, means for winding a surface finishing strip thereon, means for bending the protruding marginal portions thereof, and means inserting neck in body.

69. In a box-making machine, the combination of an axially reciprocating and rotary shaft provided with a plunger head, an axially reciprocating and rotary shaft provided with a clamping head and co-axially in line with last mentioned shaft, means for coöperatively actuating said shafts, means for feeding previously scored body-blanks between said heads, an aperture disposed for said heads to pass the body-blank therethrough bending it at the scorings, means for applying adhesive substance to one side of a surface finishing strip, means for feeding said strip to bent body-blank, a cutting device to cut said strip at the required length, means revolving in relation with said plunger head to engage said strip for winding and pasting it about the sides of bent body-blank, and to move immediately away therefrom, arms pivotally disposed around said body to bend the protruding marginal portions of the surface finishing strip, means actuating said arms, and means for tucking in the bent marginal portions of the surface finishing strip.

70. In a box-making machine, the combination of a rotary plunger, means for feeding body-blanks thereto, a rotary clamping head for clamping a body-blank to plunger and coöperating with same, means for bending the sides of body-blank, means for feeding a surface finishing strip to bent sides of blank, means for severing said strip, means for engaging and pasting said strip on bent sides of blank while being wound thereon, pivoted arms disposed about said clamping head to bend the protruding marginal portions of the surface finishing strip, and means for tucking in the bent marginal portions on one side thereof.

71. In a box-making machine, the combination of an axially reciprocating and rotary shaft provided with a plunger head, an axially reciprocating and rotary shaft provided with a clamping head and co-axially in line with last mentioned shaft, means for coöperatively actuating said shafts, means for feeding previously scored body-blanks between said heads, means for bending the sides of body-blank, means for feeding a surface finishing strip to bent sides of blank, means for severing said strip, means for engaging and pasting said strip on bent sides of blank while being wound thereon, pivoted arms disposed about said clamping head to bend the protruding marginal portions of the surface finishing strip, and means for tucking in the bent marginal portions on one side thereof.

In testimony whereof we have set our hands in the presence of two subscribing witnesses.

VINCENT RAGONA.
JOHN RAGONA.
WILLIAM RAGONA.

Witnesses:
 JOSEPH BOTTARI,
 ANTONIO W. BISOZZA.